US009998796B1

(12) United States Patent
Kedenburg, III et al.

(10) Patent No.: US 9,998,796 B1
(45) Date of Patent: Jun. 12, 2018

(54) ENHANCING LIVE VIDEO STREAMS USING THEMED EXPERIENCES

(71) Applicant: Facebook, Inc., Menlo Park, CA (US)

(72) Inventors: George Lewis Kedenburg, III, San Francisco, CA (US); Tory Hargro, Foster City, CA (US)

(73) Assignee: FACEBOOK, INC., Menlo Park, CA (US)

(*) Notice: Subject to any disclaimer, the term of this patent is extended or adjusted under 35 U.S.C. 154(b) by 0 days. days.

(21) Appl. No.: 15/376,620

(22) Filed: Dec. 12, 2016

(51) Int. Cl.
*H04N 21/482* (2011.01)
*H04N 21/2187* (2011.01)
*H04N 21/466* (2011.01)

(52) U.S. Cl.
CPC ....... *H04N 21/482* (2013.01); *H04N 21/2187* (2013.01); *H04N 21/466* (2013.01)

(58) Field of Classification Search
CPC ............. H04N 21/482; H04N 21/2187; H04N 21/466; H04N 21/4532; H04N 21/25825; H04N 21/422; H04N 21/4788; H04N 21/4223; H04N 21/8405; H04N 21/47217; H04N 21/2387; H04N 21/44; H04N 21/47; H04N 21/6175; H04N 21/658; G06F 17/30828; G06Q 50/01
USPC .......................................................... 725/38
See application file for complete search history.

(56) References Cited

U.S. PATENT DOCUMENTS

| | | | | |
|---|---|---|---|---|
| 2008/0195997 | A1* | 8/2008 | Herberger | G06F 8/34 717/100 |
| 2010/0223128 | A1* | 9/2010 | Dukellis | G06Q 30/0253 705/14.51 |
| 2011/0008017 | A1* | 1/2011 | Gausereide | G11B 27/034 386/280 |
| 2013/0083215 | A1* | 4/2013 | Wisniewski | H04N 5/23222 348/222.1 |
| 2015/0318020 | A1* | 11/2015 | Pribula | H04N 21/43615 386/227 |
| 2015/0340067 | A1* | 11/2015 | Kalish | G11B 20/00007 386/285 |
| 2017/0109585 | A1* | 4/2017 | Matias | G06K 9/00718 |

* cited by examiner

*Primary Examiner* — Nathan Flynn
*Assistant Examiner* — Cynthia Fogg
(74) *Attorney, Agent, or Firm* — Keller Jolley Preece

(57) ABSTRACT

The present disclosure is directed toward systems and methods for enhancing a live video stream. For example, a communications system improves live video streams for a content producer broadcasting a live video stream as well as other users viewing the live video stream. In particular, the communications system employs themed experiences that guide the content producer through the process of creating and sharing a quality customized live video stream. In addition, the communications system provides one or more digital enhancements to a live video stream based on engagement signals (e.g., reactions) from viewers of the live video stream.

20 Claims, 14 Drawing Sheets

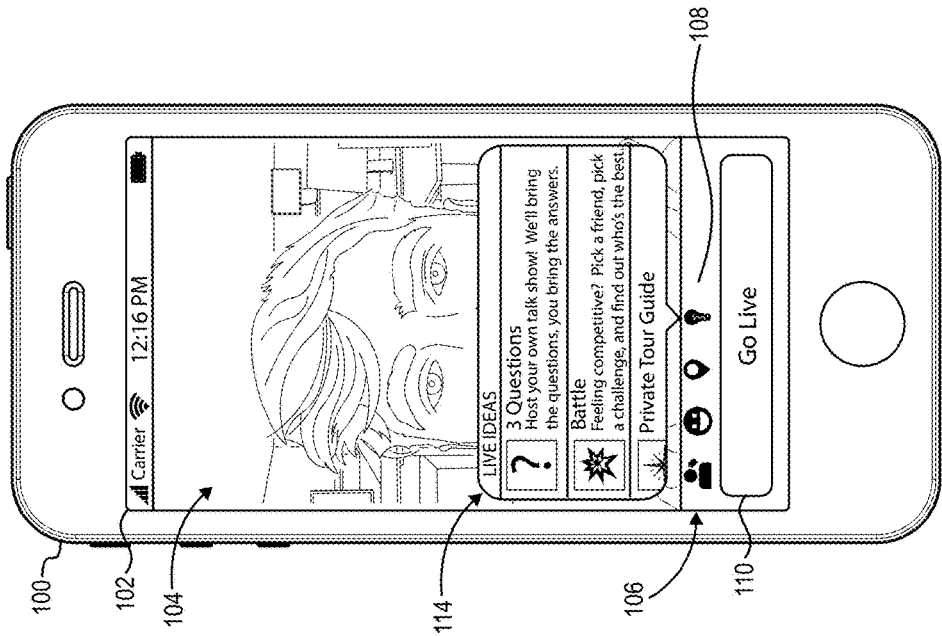
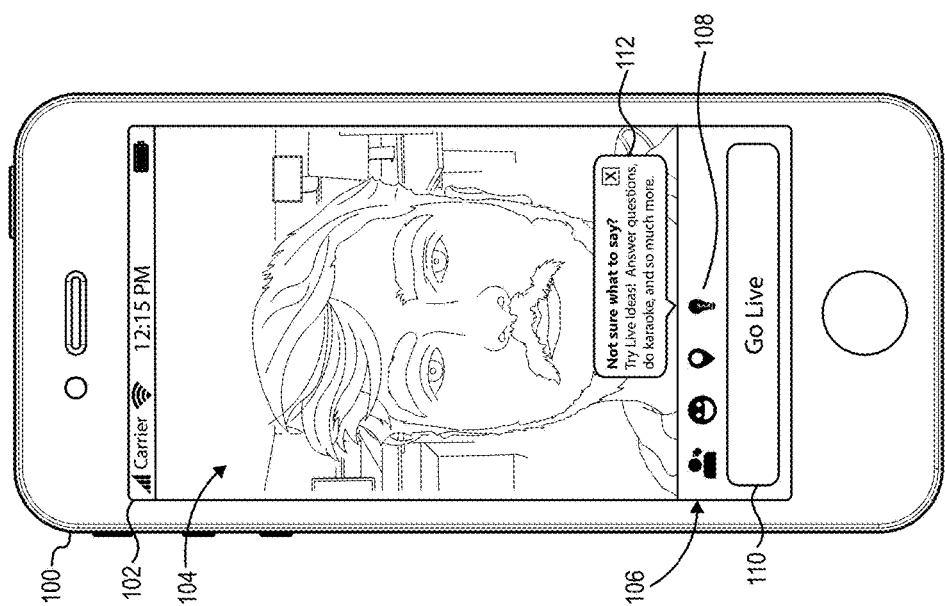
Fig. 1B
Fig. 1A

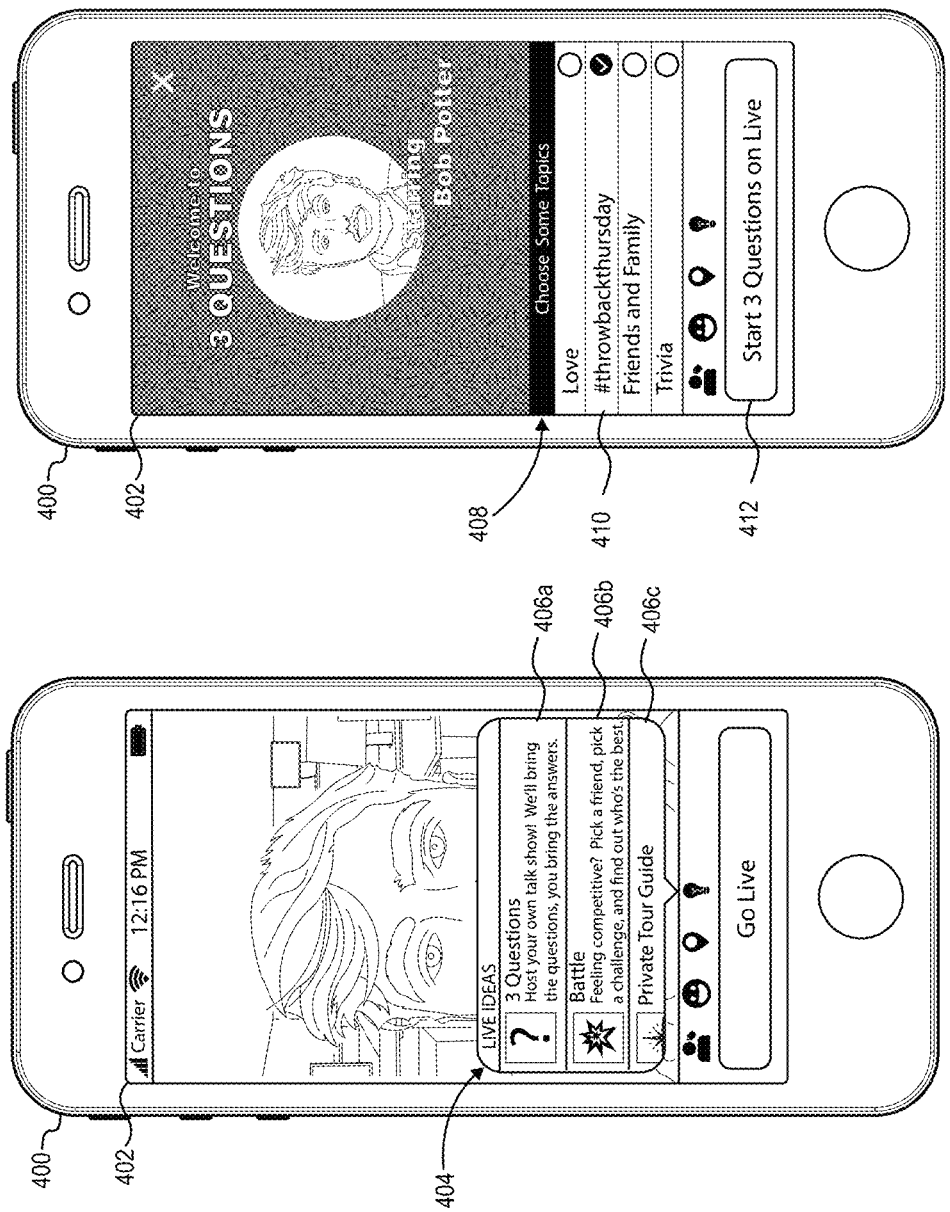

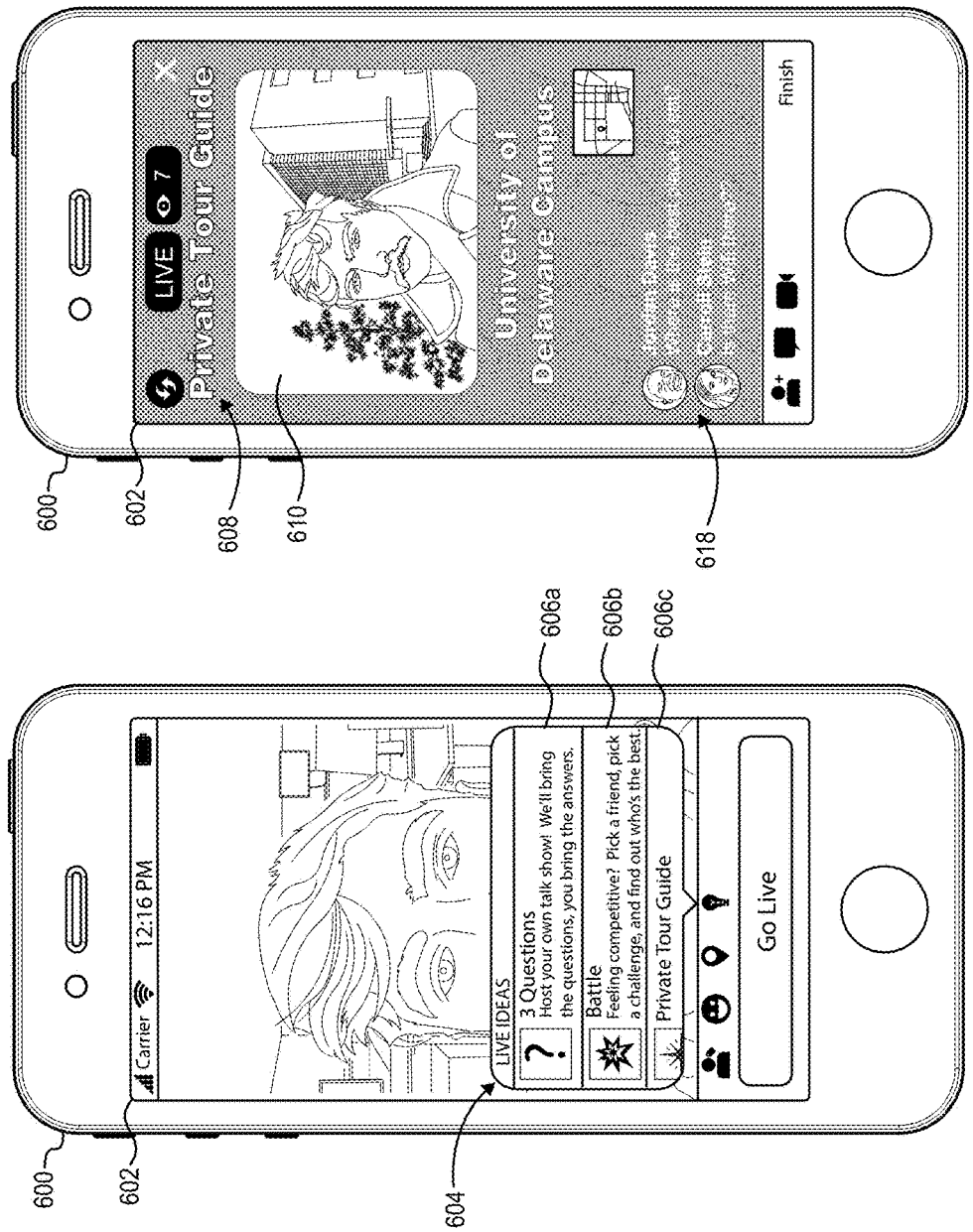

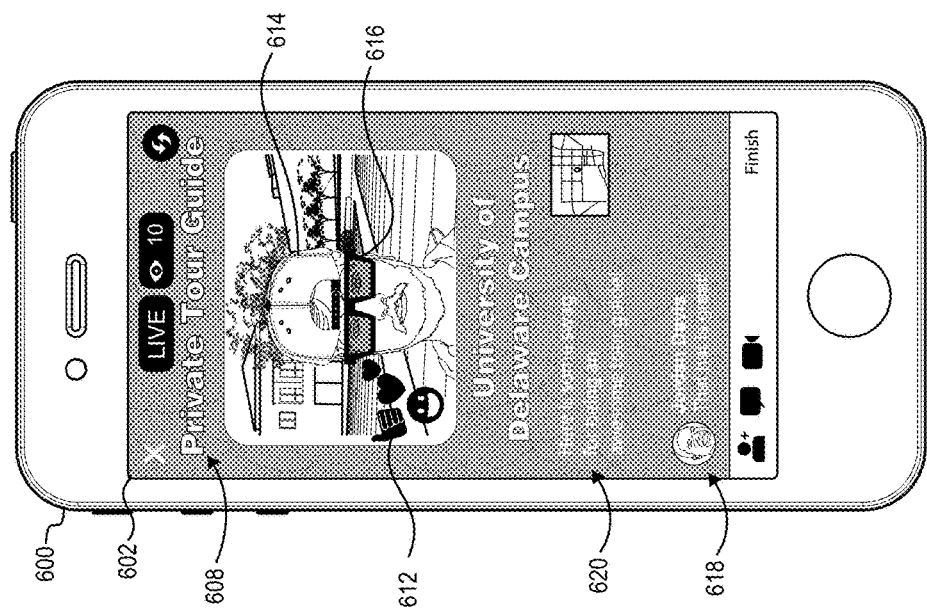
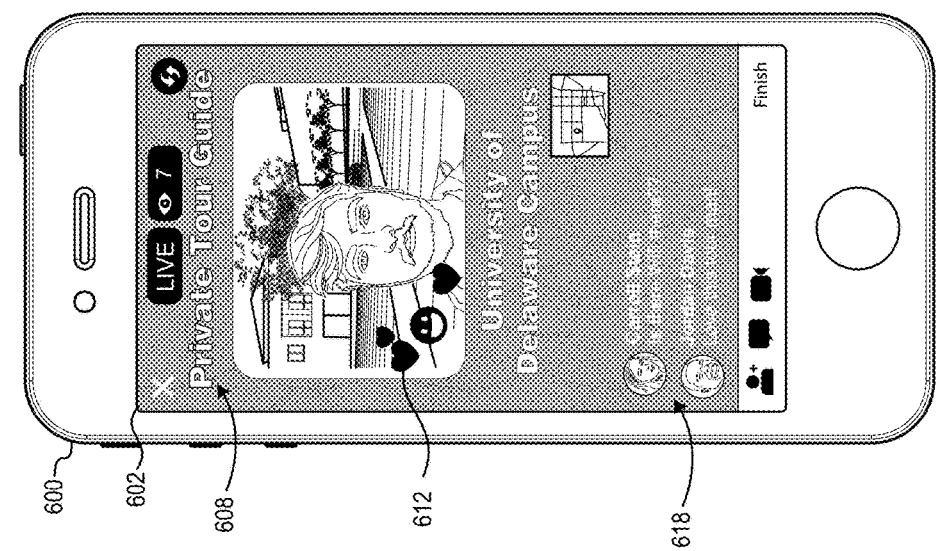
Fig. 6D
Fig. 6C

ENHANCING LIVE VIDEO STREAMS USING THEMED EXPERIENCES

BACKGROUND

Through advancements in computing devices and computing technology, individuals can often share user-generated media with others. As such, individuals are increasingly capturing and sharing experiences using various computing devices. For example, modern mobile devices enable individuals to capture and share media such as pictures, videos, audio, and text. In particular, video communication provides an increasingly popular method for connecting with others. For example, where communications systems once limited users to communicate via written electronic communications, users can now communicate electronically via images or videos taken from a personal computing device, such as a smart phone. Indeed, communications systems now enable users to broadcast live video streams as a method for communicating with other users. To illustrate, communications system user can broadcast a live video stream, captured by a smartphone camera, to one or more other users. The live video stream depicts the broadcaster in a non-time-shifted display (e.g., a live display).

Despite the ability to broadcast live video communications, broadcasting live video is generally limited to broadcasting a plain video capture (e.g., the video broadcast includes only image content captured by a camera). For example, broadcasting live often involves broadcasting video content from a mobile computing device such as a smart phone, which are limited in processing power to provide editing or enhancement capabilities for a broadcaster to enhance a broadcast of a live video. In particular, due to the limited computing resources on a smart phone, for example, conventional systems are unable to provide a video editing option that allows a smart phone to simultaneously capture video content, enhance the video content, and broadcast the enhanced video content without also overwhelming the computing resources of most mobile devices, which would result in a poor quality broadcast.

Moreover, conventional systems relate primarily to performing video enhancements on a pre-recorded video file. For example, conventional video editing systems enable adding enhancements and other special effects to a video that was previously captured and saved as a digital video file. In addition, conventional systems involve time-consuming user review and previewing of the video to combine enhancements and edits to the video. As a result, conventional systems fail to provide broadcasters of a live video stream with an opportunity to enhance a live video since a live video is generated from a current feed from a camera, and not from a pre-captured digital video file.

Due to the technical limitations and shortcomings of conventional systems, conventional video broadcasts often result in plain video that does little to engage viewers. Accordingly, and as a result of special effects and enhancements to TV and movies, plain video broadcasts often appear boring, unoriginal, an unengaging to most viewers. Accordingly, conventional systems for broadcasting live videos have a number of disadvantages.

SUMMARY

Embodiments described herein provide benefits and/or solve one or more of the foregoing or other problems in the art by employing systems and methods that provide live video templates (e.g., themed experiences) to content producers (e.g., users), which guides the content producers through the process of creating and broadcasting an enhanced live video stream. As an overview, a live video template provides a content producer with a template of interactive topics, cues, and prompts that enables the content producer to generate meaningful content within the live video stream. Additionally, a live video template adds audio-visual elements (e.g., overlays) that transform a live video stream into an enjoyable audiovisual experience for other users viewing the live video stream (or simply "viewers").

In addition to making these live video templates available to content producers to improve live video streams, the systems and methods intelligently organize and present one or more live video templates to each content producer in a manner that maximizes the broadcasting success of the content producer. Thus, depending on a number of factors, such as the content producer's previous experience in creating live video streams, potential viewers of a live video stream, the content producer's location, and trending live video templates, the systems and methods recommend one or more live video templates to a content producer. As such, the content producer benefits from a positive live broadcasting experience and viewers of the live video stream benefit from enjoying quality content.

To illustrate an example of intelligently organizing and presenting live video templates to a content producer, in one or more embodiments, the systems and methods maintain a collection of live video templates for content producers of a communications system. For each content producer of the communications system, the systems and methods identify activity data associated with the content producer, and based on the identified activity data, determine one or more live video templates from the collection of live video templates. After the determination, the systems and methods provide the one or more determined live video templates.

In some embodiments, the systems and methods can also provide digital enhancements as part of a live video stream to enrich the live broadcasting experience for both the content producer and the viewers. For example, the systems and methods can overlay a digital enhancement on a live video stream in response to receiving reactions (e.g., engagement signals) from viewers. As another example, the systems and methods can overlay a digital enhancement on a live video stream based on the content producer reaching specific broadcast milestones.

BRIEF DESCRIPTION OF THE DRAWINGS

To better describe the manner in which the systems and methods obtain the advantages and features of the disclosed embodiments, a number of example embodiments are described in connection with accompanying drawings, as indicated below.

FIGS. 1A-1B illustrate example graphical user interface views of providing themed experiences to a content producer on a client device in accordance with one or more embodiments described herein.

FIGS. 4A-4F illustrate example graphical user interface views of applying a themed experience to a content producer's live video stream in accordance with one or more embodiments described herein.

FIGS. 6A-6D illustrate example graphical user interface views of overlaying digital enhancements onto a live video stream in accordance with one or more embodiments described herein.

DETAILED DESCRIPTION

Figure 2:
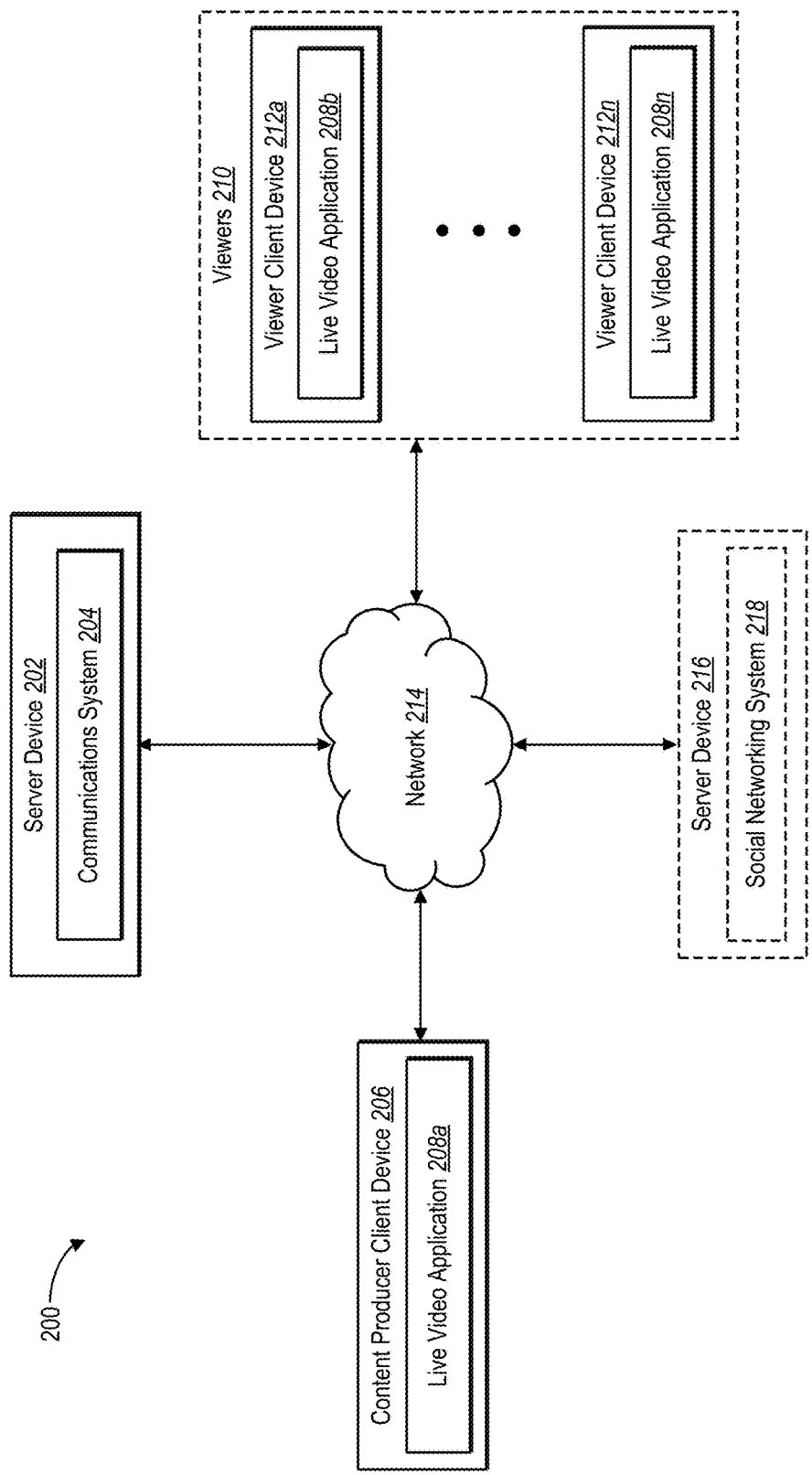
FIG. 2 illustrates an example embodiment of a communications environment in which the communications system operates in accordance with one or more embodiments described herein.

The embodiments disclosed herein describe a communications system that improves live video streams for both a content producer (or simply "user") and other users viewing the live video stream (or simply "viewers") by employing live video template (e.g., themed experiences) that guide a content producer through the process of creating and sharing an enhanced live video stream. In general, a live video template provides a content producer with an interactive topic, including cues and prompts, which enables the content producer to generate meaningful content within the live video stream. In addition, a live video template includes graphics, audio, animations, and/or visual transitions that transform the live video stream into an enhanced audiovisual experience for viewers.

As mentioned above, the communications system provides one or more live video templates to each content producer, which improves live video streams for both content producers and viewers. To explain, the communications system maintains a collection of live video templates for content producers of the communications system. As noted above, a live video template includes curated topic templates that guide a content producer through a live video stream as well as provide audiovisual elements that enhance the live video stream.

Using the maintained collection of live video templates, the communications system determines one or more live video templates to provide to a content producer based on the content producer's interactions with the communications system or other factors. More specifically, the communications system identifies activity data on the communications system that is associated with a content producer. Based on the identified activity data, the communications system determines one or more live video templates from the collection of live video templates that best fit the content producer. The communications system then provides the one or more live video templates to the content producer via the content producer's mobile client device.

To briefly illustrate by way of example, a content producer wants to share a live video stream but is unsure what to share. As such, upon selecting the option to start a live video stream, the communications system presents the content producer with a number of live video templates tailored to the content producer. In particular, the communications system identifies and analyzes various factors to determine which live video templates will provide the content producer with a positive and/or successful experience. As described further below, factors can include the content producer's previous experience in creating live video streams, potential viewers of a live video stream, the content producer's location, and trending live video templates. Upon selecting a live video template, the communications system provides audiovisual enhancements to a live video stream as well as guides the content producer through the live video stream.

In some embodiments, the communications system provides additional enhancements to a live video stream. For example, the communications system provides digital rewards (i.e., digital enhancements) within a live video stream to incentivize participation from the content producer and viewers. A digital enhancement can include a mask, filter, themes, stickers, or other overlays applied to a live video stream.

To demonstrate, the communications system overlays a digital enhancement on a live video stream in response to receiving engagement signals (e.g., comments, likes, emoji, and/or shares) from viewers. For instance, the communications system overlays a crown to the content producer based on receiving 20 positive engagement signals from viewers. As another example, the communications system overlays a digital enhancement on a live video stream based on the content producer reaching specific milestones in a broadcast. For instance, if the content producer broadcasts for over 5 minutes or reaches 15 views, the communications system displays a trophy or badge on top of the live video stream.

Rather than automatically providing a digital enhancement to a live video stream, in some embodiments, the communication system provides indications to a content producer when one or more digital enhancements become available. For example, the communication system provides an indication to a content producer when the content producer is awarded one or more digital enhancements (e.g., the communication system stores the available digital enhancements in a tray accessible during a live video stream). The content producer can then choose when to apply the digital enhancement in the live video stream. In some embodiments, the communication system enables the content producer to user various digital enhancements in a live video stream based on global achievements and accomplished milestones (e.g., over 1,000 total views).

In addition to the above, the communications system provides a number of additional advantages and benefits over conventional communication systems. For example, the communications system eliminates many of the hesitancies and barriers that content producers face when attempting to share a live video stream. In addition, the communications system provides live video templates that assist content producers in sharing quality content that viewers are interested in consuming. The live video templates also enhance the production quality of live video streams, which increases the quality of live video streams. As such, content producers benefit from confidently sharing their user-generated content in a manner that informs and entertains viewers. Furthermore, viewers greatly benefit from being able to enjoy and participate in quality live video streams.

As another benefit, the communications system further enhances the quality of live video streams by incentivizing participation of both a content producer and viewers.

Because the communications system provides digital enhancements based on viewer engagement signals and participation, viewers become more engaged in a live video stream, which encourages the content producer to continue the live video stream as well as share future live video streams. Likewise, the communications system encourages viewers to create and share their own live video stream using live video templates.

The communications system further enhances the live video stream without utilizing substantial processing power of the broadcasting and/or viewing device(s). For example, the communications system identifies one or more templates to enhance a live video. Thus, rather than manually modifying the live video stream, the communications system uses pre-generated content that can be added to the live video stream to provide an enhanced live video presentation that includes both the live video stream and the video enhancements.

In one or more embodiments, the video presentation system provides the live video template by using a template and providing the live video template to a viewer client device for display. In particular, a server device generates a live video template and provides the enhancements to the viewer client device. Alternatively, in one or more embodiments, rather than providing the live video template to the viewer device, the video presentation system provides an indicator of a template to the viewer device to enable the viewer device to locally generate the theme experience overlay on the viewer device. For example, where the viewer device has a live video application thereon and locally stores various templates associated with live video templates, the communications system can simply provide information (e.g., the template id of the live video template) to the viewer device to enable the viewer device to generate the or access a locally stored or otherwise accessible live video template that the viewer device combines with the live video stream from the broadcaster device. In this way, the communications system provides live video template or other live video enhancements using less bandwidth (e.g., less additional bandwidth). Alternatively, the content producer's device can directly provide the template id to one or more viewer client devices.

In addition, the communications system facilitates enhancement of a live video presentation without requiring that a broadcaster engage in time-consuming editing after the video has been recorded and stored to a computing device. Rather, the communications system generates the video enhancement based on dynamic information associated with the content producer and provides the live video template or other enhancements in conjunction with the live video stream. Thus, the communications system enhances a presentation of the live video stream while also avoiding the computer resource intensive and time intensive process of manually modifying video content. Moreover, the communications system enables the enhancement of a live video stream by removing the conventional steps of downloading and/or storing video content prior to implementing the various enhancements. These and other advantages are discussed in more detail with respect to the following figures.

As an overview, FIGS. 1A-1B illustrate a content producer client device 100 having a graphical user interface 102 that displays themed experiences (i.e., live video templates) to a content producer. A live video application running on the content producer client device 100, which also communicates with a communications system, may display the graphical user interface 102. In one or more embodiments, the live video application is part of a social networking application and also communicates with a social networking system. While the content producer client device shown is a mobile client device, one will appreciate that other types of client devices can be employed, as described below.

As shown in FIG. 1A, the graphical user interface 102 displays an image capture 104 of a content producer. For example, the content producer client device 100 includes at least one camera and microphone that capture images, video, and sounds in real-time. As such, the graphical user interface 102 includes an image capture 104 of the content producer as well as options, described below, for the content producer to share the image capture 104 as a live video stream.

FIG. 1A also displays a toolbar 106 that includes various selectable elements and options, including a live broadcast element 110 (e.g., the "Go Live" button). A content producer can select the live broadcast element 110 to start a live video stream. Upon selecting the live broadcast element 110, the communications system provides the live video stream from the content producer client device 100 to other viewers of the communications system.

In general, the content producer provides sharing preferences that indicate to the communications system which viewers are authorized to view the content producer's live video stream. For example, the content producer indicates that the communications system is authorized to share a live video stream with friends, family, co-workers, neighbors, and/or the public at large. Additional detail regarding sharing and authorizations are provided below with respect to FIG. 11.

The toolbar 106, as shown, also includes a themed experience option 108 (shown as a light bulb icon). The themed experience option 108 provides the content producer with a list of themed experiences that the content producer can select when initiating a live video stream. FIG. 1B below further describes the themed experiences and the themed experience option 108.

FIG. 1B also shows a themed experience notification 112. When the content producer is new to live video streams or is unfamiliar with themed experiences, in one or more embodiments, the graphical user interface 102 can include a themed experience notification 112, which is associated with the themed experience option 108. The themed experience notification 112 apprises the content producer regarding themed experiences. In particular, the themed experience notification 112 informs a content producer that the communications system can help the content producer with creating, sharing, and enhancing a live video stream.

Upon selecting the themed experience option 108, the graphical user interface 102 displays one or more themed experiences (e.g., "live ideas") to the content producer. To illustrate, FIG. 1B shows an example list 114 of themed experiences to the content producer via the graphical user interface 102. As described in detail below, the communications system selects a subset of themed experiences from a collection of themed experiences that best fits each user. Further, the communications system prioritizes and/or ranks the selected themed experiences in a manner that is personalized to each content producer.

The content producer can select a themed experience from the list 114 of themed experiences. As mentioned, a themed experience provides a template of interactive topics for a content producer to follow while sharing a live video stream with viewers. In some cases, the content producer provides input regarding a selected themed experience before beginning a live video stream and, in response, the communications system customizes the themed experience based on the user producer input. Illustrative examples of themed experiences are provided in the figures below.

Themed experiences can relate to a variety of topics. Further, themed experiences can include several challenges, activities, and missions to motivate and inspire a content producer within a live video stream. Examples of themed experiences include, but are not limited to, a talk show, a newscast (where the generated news stories are positive in nature), a private tour, "This or That" questions, "Ask Anything," an all-about-me report, a poll between two topics, a treasure hunt, an object find, a rap battle, a lip syncing challenge, a show and tell, etc.

FIGS. 1A-1B provide a general overview of themed experiences. Subsequent figures provide additional context, detail, and illustrations of how the communications system provides and prioritizes themed experiences for content producers. To illustrate, FIG. 2 shows an example embodiment of a communications environment 200 in which the communications system 204 operates.

As shown, the communications environment 200 includes the communications system 204 and enables operation of one or more example embodiments of the communications system 204. As illustrated, the communications system 204 operates on a server device 202. In some embodiments, the communications system 204 operates on multiple server devices.

The communications environment 200 also includes a content producer client device 206 (associated with a content producer) and one or more viewer client devices 210a-n (associated with viewers 210). The communications system 204 communicates with the content producer client device 206 and the viewer client devices 212a-n via a network 214. In some embodiments, the content producer client device 100 described above in connection with FIGS. 1A and 1B is an example embodiment of the content producer client device 206 within the communications environment 200.

The content producer client device 206 and the viewer client devices 212a-n, as shown, each includes a live video application 208a-n. In general, the live video applications provide corresponding content producers access to the communications system 204. For example, a content producer employs the live video application 208a on the content producer client device 206 to capture and share a live video stream with the viewers 210 via the communications system 204. Likewise, a viewer uses the live video application 208b on the first viewer client device 212a to view, react to, and comment on the live video stream provided by the communications system 204.

As described further below, the communications system 204 can provide themed experiences to the content producer. In particular, the communications system 204 displays a prioritized list of themed experiences fitted to the content producer via the live video application 208a on the content producer client device 206. Further, the communications system 204 can overlay digital enhancements to a live video stream and provide the enhanced live video stream to the viewers 210 (via the viewer client device 212a-n) and back to the content producer (via the content producer client device 206).

Although FIG. 2 illustrates a particular arrangement of the various components within the communications environment 200, various additional arrangements are possible. Further, while the communications environment 200 displays a single content producer client device 206, one will appreciate that the communications environment 200 can include any number of content producer client devices.

Additional details regarding the various computing devices and networks are explained below with respect to FIG. 9.

In some embodiments, the communications environment 200 includes a social networking system 218. FIG. 2 illustrates that an optional server device 216 hosts the optional social networking system 218 when the social networking system 218 is included in the communications environment 200. The social networking system 218 can connect the content producer and viewers together via various interests, people connections, and groups. Additional information regarding the social networking system 218 is provided below in connection with FIGS. 10-11.

In one or more embodiments, the communications system 204 operates within or in connection with the social networking system 218. For example, the content producer and viewers are social networking users and connect via the social networking system 218. As such, the content producer and viewers can communicate with each other via the communications system 204 within the social networking system 218. In addition, connections, preferences, and permission set by a content producer in the social networking system 218 can carry over to the communications system 204.

The term "live video," as used herein refers to digital audiovisual data that can be transmitted over a communications network. In general, live video is broadcast in real-time (non-time shifted) or near-real-time. In other words, a live video is a video that is captured and broadcast simultaneously. Examples of live video include, but are not limited to, digital video files, digital audio files combined with digital photos, and/or streaming content. Accordingly, a live video may include media such as images, video, audio, text, animations, or any other audio/visual content that may be transmitted over a communication network in the form of a live video stream.

Generally, a content producer captures live video, for example, using a mobile client device. As such, live video includes user-generated media (e.g., content that a content producer captures using a video capturing feature of a smart phone, such as digital photos or videos). However, in some embodiments, live video also includes nonuser-generated media (e.g., content generated by a party other than a content producer but to which the content producer has access).

As used herein, the term "live video stream" refers to a transmission or broadcast of live video. Generally, a live video stream includes live or near-live transmissions of media. For example, a content producer broadcasts (e.g., shares), via the communications system, a live video stream with one or more viewers (e.g., viewers viewing a live video stream) of the communications system. In some embodiments, a live video stream includes the transmissions of recorded or stored media. For instance, the content producer creates a live video stream and the communications system stores and subsequently broadcasts the live video stream to one or more viewers of the communications system.

The terms "interact" or "interacting," as used herein, refer to any type of interface activity between a user (e.g., a content producer or a viewer) and a client device (e.g., a content producer client device or a viewer client device). For example, interacting can include a user viewing, browsing, accessing, and/or otherwise experiencing video content. Moreover, interacting can include selecting elements on a client device, such as selecting menu options or graphical buttons to create a live video stream or add a media segment to an existing live video stream. For instance, a user can interact with a client device to capture a live video stream, view a live video stream, and/or engage (e.g., react, "like,"

comment, provide a positive engagement, or provide a negative engagement) to a live video stream.

Figure 3:
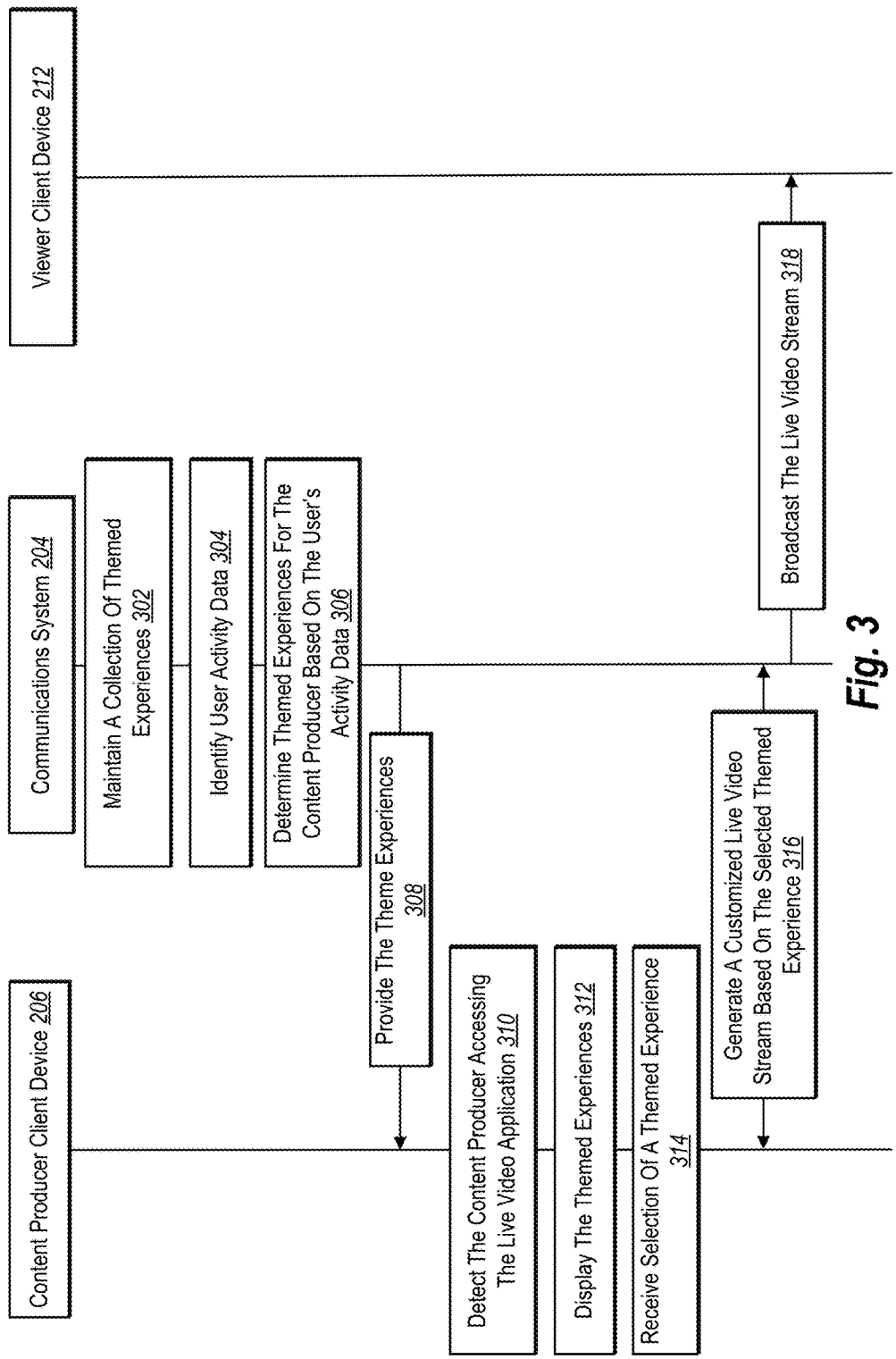
FIG. 3 illustrates a sequence diagram of determining one or more themed experiences for a content producer in accordance with one or more embodiments described herein.

FIG. 3 illustrates a sequence diagram of determining one or more themed experiences for a content producer. As shown, FIG. 3 includes a communications system 204, a content producer client device 206, and a viewer client device 212. The communications system 204, the content producer client device 206, and the viewer client device 212 shown in FIG. 3 can be the same or similar components as those described with respect to FIG. 2 above. For example, the server device 202 hosts the communications system 204 and is part of the communications environment 200.

As illustrated, the communications system 204 maintains 302 a collection of themed experiences. As mentioned above, a themed experience includes curated topic templates that guide a content producer through a live video stream as well as provide audiovisual elements that enhance the live video stream. For example, many themed experiences include a customized introductory pre-roll graphics sequence, a themed overlay, and an outro graphics sequence (e.g., a concluding audio and/or video segment). Example illustrations of themed experiences are provided in FIGS. 4A-4F and FIGS. 6A-6D below.

As part of maintaining the collection of themed experiences, in some embodiments, the communications system 204 acquires new themed experiences to add to the collection. For example, the communications system 204 obtains new themed experiences from a third-party or a curator that creates themed experiences. The communications system 204 can store newly obtain themed experiences along with existing themed experiences in a database or storage associated with the communications system 204. Alternatively, in some embodiments, the communication system 204 generates one or more themed experiences. For example, the communication system 204 dynamically selects one or more introductory pre-roll graphics sequence, a themed overlay, and an outro graphics sequence to include in a themed experience. Further, in some embodiments, the communication system 204 enables and guides users through the process of creating themed experiences In addition, the communications system 204 can deactivate (e.g., suspend, retire, or discard) existing themed experiences within the collection. The communications system 204 can deactivate one or more current themed experiences within the collection based on various factors, such as the themed experience's age (e.g., length of time the themed experience is active), usage (e.g., the number of content producers that select the themed experience), popularity (e.g., whether the themed experience yields above-average levels of user interaction for content producers and viewers and/or how often the themed experience is shared), relevancy (e.g., whether the subject matter of the themed experience is current or outdated), trendiness (e.g., whether the themed experience is increasing in popularity/usage based on social networking data) and/or randomness.

Likewise, the communications system 204 can reactivate a deactivated themed experience based on the same factors. For example, the communications system 204 deactivates a themed experience after three days and reactivates the themed experience two days later, or according to a different schedule. Further, an administrator of the communications system 204 can manually activate or deactivate themed experiences in the collection.

In one or more embodiments, the communications system 204 limits the number of themed experiences in the collection that are active (i.e., available) at one time. For example, the communications system 204 limits the number of available themed experiences within the collection to ten or twenty. In other embodiments, the communications system 204 activates (e.g., makes available) all themed experiences within the collection of themed experiences.

In some embodiments, the communications system 204 makes one themed experience available to one content producer but unavailable to another content producer. For example, a subset of themed experiences is available to novice content producers of the communications system 204 but not to advanced content producers. As another example, the communications system 204 makes a birthday themed experience available (e.g., activates) for content producers around their birthday, but otherwise deactivates the themed experience.

The communications system 204, in one or more embodiments, limits the number of available themed experiences that a particular content producer can access by applying filters to the available themed experiences in the collection. For instance, the communications system 204 filters available themed experiences based on one or more of the above-described factors (e.g., themed experience age, overall usage, popularity, relevancy, and/or trendiness).

In some embodiments, the communications system 204 limits the number of available themed experiences based on a set number (e.g., 15) or set percentage (e.g., 40%) of the themed experiences in the collection. In further embodiments, the communications system 204 randomly determines which themed experiences are available to each content producer while following the above-provided constraints.

In addition to maintaining a collection of themed experiences, FIG. 3 shows that the communications system 204 identifies 304 user activity data on the communications system 204 for a content producer (e.g., the content producer associated with the content producer client device 206). The communications system 204 identifies activity data on the communications system 204 from a variety of sources. For instance, the communications system 204 identifies activity data based on past interactions of the content producer with regard to live video streams. In addition, the communications system 204 can receive and store device data received from the content producer client device 206 as it relates to interactions with the communications system 204. Further, the communications system 204 can identify activity data based on user profile information and/or social interactions of the content producer.

As mentioned above, in one or more embodiments, activity data includes a content producer's past interactions with live video streams. For example, activity data includes the number of previous live video streams by the content producer, the duration of previous live video streams, the number of viewers for each previous live video streams, and/or the total number of unique viewers. Additional examples of activity include which themed experiences the content producer previously used (or ignored), themed experiences used and/or "liked" by viewers, the potential viewer reach of a current live video stream, preferences and interests of the potential viewers, and/or preferences of frequent viewers.

In addition, activity data can include data received from the content producer client device 206. For instance, activity includes the content producer client device's location (e.g., based on GPS positioning, cell triangulation, Wi-Fi, check-ins, calendar location data, smart text location data, and/or user input), local time, movement (e.g., accelerometer data), orientation (e.g., gyroscope data), and/or hardware capabilities. Further, as mentioned above, activity data can include user profile information such as user demographics, age, relationships, job information, social data, interests, and/or other user profile information.

As shown in FIG. 3, the communications system 204 determines 306 themed experiences for the content producer based on the content producer's activity data. In general, the communications system 204 compares the content producer's activity data with all, active, or available themed experiences in the collection to determine one or more themed experiences to provide to a content producer. As such, the communications system 204 provides themed experiences that are tailored to the content producer. In this manner, the provided themed experiences not only reduce a content producer's uncertainty to initiate a live video stream, but also make live video streams fun and enjoyable, which motivates the content producer to actively create and share live video streams.

As part of determining themed experiences for the content producer based on the content producer's activity data, the communications system 204 analyzes each (e.g., all, active, or available) themed experience to identify user characteristics (e.g., attributes, values, quantities, qualities, or properties) that correlates to the content producer's activity data. In one or more embodiments, a curator of a themed experience provides user characteristics for the themed experience. For example, a curator indicates that a particular themed experience is best suited for content producers of a particular demographic, interest group, client device type, and/or social networking profile. In some embodiments, the communications system 204 associates user characteristics to a themed experience based on usage and/or user feedback. For example, the communications system 204 detects that content producers at a particular location frequently select a particular themed experience and, as such, assigns the location to a user characteristic of the themed experience.

As an example of the communications system 204 determining themed experiences for a content producer, the communications system 204 identifies, from user activity data on the communications system 294, that the content producer is a teenager who has yet to share a live video stream with viewers. Based on this activity data, the communications system 204 identifies an available themed experience having user characteristics of: trending topics among teenagers, little or no live video broadcasting experience, and ideal for small audiences, as a fit for the content producer. The communications system 204 may continue matching the content producer's activity data to user characteristics of themed experiences until the communications system 204 determines a threshold number of themed experiences (e.g., 3, 5, 10, or 15) to provide to the content producer.

As mentioned above, the communications system 204 analyzes user characteristics of each themed experience to identify which themed experiences correlate to the content producer's activity data. For example, when the communications system 204 determines a match between a user characteristic of a themed experience and the content producer's activity data, the communications system 204 adds a tally to the themed experiences. The communications system 204 then provides, to the content producer, each themed experience with a tally over a minimum correlation threshold, and/or provides a preset number (e.g., 3, 5, 10, or 15) of themed experiences having the highest tallies.

Rather than using a tally matching system, in some embodiments, the communications system 204 determines a correlation score between user characteristics of a themed experience and the content producer's activity data. For example, the communications system 204 determines correlation strengths for each user characteristic of a themed experience based on how well the user characteristic fits (e.g., correlates) with the content producer's activity data. The correlation strength can be relative (e.g., strong, weak, neutral, negative) or actual (e.g., between 0-1). The communications system 204 then combines (e.g., sums) the correlations strengths together for a themed experience to obtain a correlation score for the themed experience. Then, using the correlation scores, the communications system 204 determines which themed experiences best correlate to the content producer. Further, in some embodiments, the communications system 204 normalizes the correlation score for each themed experience, by averaging the aggregate correlation strengths, to ensure that each themed experience is treated uniformly.

Based on the correlation scores, the communications system 204 provides the determined themed experiences to the content producer. In one or more embodiments, the communications system 204 provides themed experiences that have a correlation score above a threshold value. As mentioned above, the communications system 204 may also limit the number of themed experiences provided to the content producer (e.g., provide five or less themed experiences). In some embodiments, the communications system 204 provides additional themed experiences to a content producer based on the content producer requesting additional themed experiences.

In one or more embodiments, the communications system 204 employs a rule-based algorithm to determine which themed experiences to provide to a content producer. For example, the communications system 204 applies the content producer's activity data and user characteristics of a themed experience to the rule-based algorithm to obtain a correlation score for each themed experience. Then, as previously mention, the communications system 204 selects one or more themed experiences to provide to the content producer based on the correlation score (e.g., highest correlation scores first). Alternatively, in some embodiments, the communications system 204 provides those themed experiences that have a correlation score above a threshold value.

In additional or alternative embodiments, the communications system 204 employs machine learning to determine which themed experiences to provide to a content producer based on the content producer's activity data and the content producer characteristics of each themed experience. For instance, the communications system 204 trains using a supervised or unsupervised data set of user characteristics. Then, the communications system 204 applies the content producer's activity data to the machine-learning model to determine matching themed experiences (or correlations scores as described above). One will appreciate that as part of employing machine learning, the communications system 204 can further employ various algorithms, such as logistic regression, k-means, naive Bayes, random forest, multidimensional, and/or other algorithms.

In one or more additional embodiments, the communications system 204 prioritizes (e.g., ranks or organizes) the determined themed experiences as a list of prioritized themed experiences. In general, the prioritization or ranking of each themed experience correlates to the likelihood that the themed experience will cause the content producer to create and share a live video stream. The communications system 204 can rank themed experiences determined based on tallies, correlation scores, or other quantitative measurements, which are described above.

As a simple example of prioritization, the communications system 204 tallies, as described above, the number of user characteristics for each available themed experience that the content producer's activity data satisfies. Then, the communications system 204 prioritizes or ranks the themed experiences based on the tallies (e.g., the total number of satisfied user characteristics). Thus, a themed experience with a tally of five satisfied user characteristics is prioritized above themed experiences with a tally of three satisfied user characteristics.

Along with prioritizing themed experiences, in additional embodiments, the communications system 204 also weights (e.g., applies a weight multiplier to) the user characteristics. For example, the communications system 204 generates a correlation score based on the combination of weights and tallies (or other technique described above). To illustrate, a first user characteristic is worth 2×, a second user characteristic is work 1.5×, and the remaining user characteristics are each worth 1×. Thus, a first themed experience with a satisfied first user characteristic and second user characteristic has a weighted correlation score of 3.5, while a second themed experience with a satisfied third, fourth, and fifth user characteristic has a weighted correlation score of 3. Accordingly, the communications system 204 prioritizes the first themed experience over the second themed experience because of the weighting, even though the second themed experience had more total satisfied user characteristics than the first themed experience.

To further illustrate, the communications system 204 applies the below formula that includes various weights to obtain a correlation score for each themed experience:

$$w_1 x_1 + w_2 x_2 + w_3 x_3 + \ldots + w_n x_n$$

where $x_1$ is a satisfied user characteristic of a themed experience (e.g., $x_1$ corresponds to the content producer's age, $x_2$ corresponds to the content producer's previous live video broadcasting experience, $x_3$ corresponds to the content producer's location, . . . , and $x_n$ corresponds to an nth criterion), and $w_1$ is a weight applied to each of the corresponding data values. The communications system 204 can apply equal, unequal, or a combination of equal and unequal weights to the above formula to determine a weighted correlation score for each themed experience.

In one or more embodiments, when determining which themed experience to provide to a content producer, the communications system 204 also considers the themed experiences themselves. For example, even though a particular themed experience has a poor correlation to a content producer's activity data, the communications system 204 determines to provide the themed experience to a content producer because the themed experience has a high usage among viewers (e.g., the themed experience is trending or very popular), the themed experience is new (or newly reactivated), or the theme is otherwise featured by the communications system 204.

An example of a featured themed experience includes a themed experience that is sponsored by an advertiser. In this example, the communications system 204 provides the sponsored themed experience to a content producer regardless of the themed experience's correlation with the content producer's activity data. In the alternative, the communications system 204 heavily weights the user characteristics of the sponsored themed experience to increase the likelihood that the sponsored themed experience is provided to the content producer. Further, in some embodiments, the communications system 204 can assign a higher correlation score to the sponsored themed experience to ensure that the sponsored themed experience ranks among the content producer's top themed experiences, in the case of prioritization.

In general, the communications system 204 determines themed experiences to provide to each content producer upon the content producer accessing (e.g., logs in or becomes active) the communications system 204. In this manner, the communications system 204 performs more determinations for content producers that actively use the communications system 204. As such, because the communications system 204 determines a tailored list of themed experiences for each content producer, the communications system 204 allocates more computing resources to active content producers than to less active content producers.

When the communications system 204 determines themed experiences for content producers, however, can vary based on a number of considerations. For example, the communications system determines themed experiences for content producers based on a trigger event, such as when: the collection of themed experiences updates (e.g., adds, activates, removes, or deactivates) one or more themed experiences, the content producer initiating a live video stream, the content producer views a live video stream from another content producer, or a content producer requests an updated list of themed experiences. As another example, the communications system 204 determines themed experiences for content producers according to a set schedule or routine (e.g., hourly, daily, weekly). In some examples, the communications system 204 determines themed experiences based on a combination of the above factors (e.g., a set schedule based on content producer activity levels and collection updates).

As shown in FIG. 3, the communications system 204 provides 308 the themed experiences to the content producer client device 206. In particular, the communications system 204 provides a customized list of one or more themed experiences determined specifically for the content producer of the content producer client device 206. The communications system 204 can provide the one or more themed experiences upon the content producer accessing the communications system 204 or based on the content producer initiating live video stream. Further, the communications system 204 can send the themed experiences to the content producer client device 206 in a file, as code, or as part of a data structure.

As illustrated, the content producer client device 206 detects 310 a content producer accessing a live video application located on the content producer client device 206. For instance, the content producer client device 206 detects user input to load the live video application and/or navigating within the live video application. For example, the content producer client device 206 detects that the content producer navigates to a live video screen where the content producer can initiate a live video stream, such as the graphical user interface shown in FIG. 1A.

In some embodiments, the live video application is also a social networking application. For example, the social networking application facilitates live video streams from the content producer to viewers of a social networking system. In this manner, the content producer can share a live video stream with one or more of their social networking connections (described below with respect to FIG. 11). Further, the communications system 204 can apply one or more of the content producer's previously configured sharing preferences to the live video streams.

Upon detecting the content producer accessing the live video application, the content producer client device 206 displays 312 the themed experiences to the content producer.

For example, upon detecting that the content producer is accessing the portion of the live video application that facilitates live video stream (e.g., the live video screen described above), the content producer client device 206 displays the list of prioritized themed experiences (or a truncated list) to the content producer. An illustration of providing a list of themed experiences to a content producer by a content producer client device is shown in FIG. 1B above as well as described in connection with FIG. 4A below.

The content producer then selects a themed experience to apply to a live video stream. Based on the content producer selection, the content producer client device 206 receives 314 the selection of the themed experience. The content producer client device 206, in connection with the communications system 204 then generates 316 a customized live video stream based on the selected themed experience. The communications system 204 then broadcasts 318 the customized live video stream to a viewer client device 212. Creating a customized live video stream based on a selected themed experience is described below in the FIGS. 4A-6F.

FIGS. 4A-4F illustrate example graphical user interface views of applying a themed experience to a content producer's live video stream. As shown, 4A-4F each includes a content producer client device 400 and a graphical user interface 402 within a live video application. Further, the content producer client device 400 includes a camera and microphone that capture images and sounds in real-time. The content producer client device 400 can be an example embodiment of the content producer client device 206 described above.

FIG. 4A illustrates a content producer client device 400 displaying a list 404 of themed experiences 406a-c to the content producer of the content producer client device 400. As shown the list 404 includes a first themed experience 406a, a second themed experience 406b, and a third themed experience 406c. While the third themed experience 406c is truncated within the list 404, a content producer can provide input to the content producer client device 400 to view the entire contents of the third themed experience 406c.

In addition, the graphical user interface 402 can display additional themed experiences in the list 404 based on user input. For instance, the live video application reveals additional themed experiences upon the content producer scrolling within the list 404 or the live video application provides a pop-out window showing additional themed experiences. Further, in some embodiments, the content producer selects an option to request additional themed experiences. For example, the list 404 includes a selectable option (e.g., "More Live Ideas") to show one or more themed experiences. Upon the content producer selecting the selectable option, the live video application can reveal additional themed experiences either stored on the content producer client device 400 or obtained from the communications system.

Upon the content producer selecting a themed experience, in one or more embodiments, the content producer client device 400 begins generating a customized themed experience for a live video stream. As mentioned above, the content producer client device 400 can communicate with the communications system to customize a live video stream based on a selected themed experience. Alternatively, in some embodiments, the selected themed experience does not include user-definable elements, in which case, the content producer client device 400 can confirm that the content producer is ready to begin his or her live video stream using the selected themed experience.

As an example of the content producer selecting a themed experience, FIG. 4B illustrates the result of the content producer selecting the first themed experience 406a. Thus, in response to the content producer selection of the first themed experience 406a, the graphical user interface 402 updates to display the selected themed experience as well as one or more customizable options 408 associated with the selected themed experience. As shown, the content producer client device 400 prompts the content producer to select one or more topics 410 that correspond to the selected themed experience. As noted above, the topics can be static topics, dynamic topic (e.g., trending topics), user-submitted topics, categorical topics, or other types of topics.

While FIG. 4B shows one example of selecting customizable options 408, one will appreciate that alternative and/or additional example are possible. For example, the content producer client device 400 may navigate the content producer through a series of questions, prompts, and selections when customizing a selected themed experience. The customizable options 408 can relate to both the subject matter of a selected themed experience as well as to the theme, graphics, animations, and/or audio of the selected themed experience.

Once a content producer is ready to begin a live video stream, the content producer selects the live video option 412. Upon the content producer client device 400 detecting a selection of the live video option 412, the content producer client device 400 starts the customized live video stream. Note that the terms "customized live video stream" and "live video stream" may be used interchangeably, but both terms represent a live video stream that employs a themed experience selected by a content producer rather than a live video without an applied themed experience.

Figure 4D:
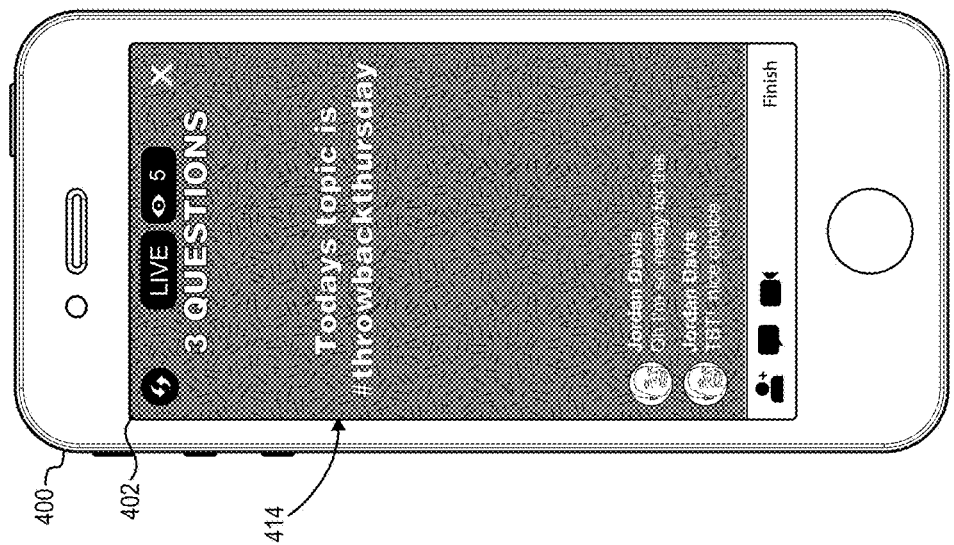
Figure 4C:
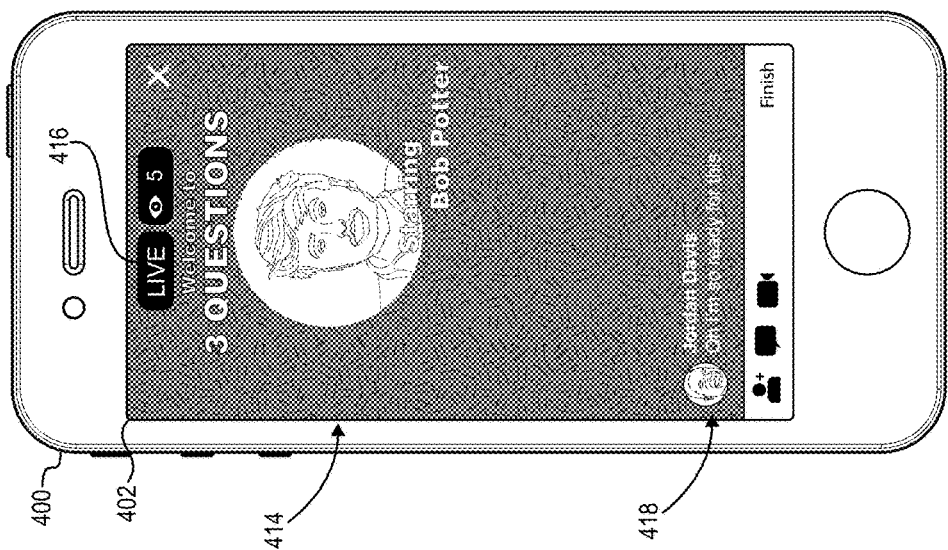

To further illustrate starting a customized live video stream, FIG. 4C illustrates a customized live video stream from the content producer. In particular, FIG. 4C shows a pre-roll animation 414 within the graphical user interface 402. As mentioned above, a pre-roll animation can include animated or static graphics. Further, a pre-roll animation can provide accompanying graphics with sound. In some embodiments, a pre-roll animation introduces the broadcaster as well as the theme selected by the content producer (e.g., based on the selected themed experience). For example, the pre-roll animation includes text and graphics informing viewers regarding the theme of the live video stream chosen by the content producer.

As shown, the pre-roll animation 414 introduces the topic of the themed experience to viewers of the live video stream. In addition, the pre-roll animation 414 can include an image of the content producer, as shown. In one or more embodiments, the communications system can obtain an image, image roll, and/or video of the content producer from a content producer's profile. In some embodiments, the communications system accesses the content producer's social networking account to obtain one or more images of the content producer.

In one or more embodiments, the communications system sends notifications to potential viewers (e.g., based on the content producer's sharing preference's) informing the potential viewers that the content producer is starting a live video stream. In some additional embodiments, the notification indicates the topic of the live video stream to a potential viewer when the communications system determines that the topic is of interest to the potential viewer. When a potential viewer selects the notification, the communications system can navigate him or her to the live video stream.

In addition, the graphical user interface 402 displays a live notification 416 to indicate that the live video stream is being broadcast live, as shown in FIG. 4C. In some embodiments, the graphical user interface 402 also displays a count of active viewers. Additionally, the graphical user interface 402 displays comments 418 and other engagement signals from viewers. For example, a viewer (i.e., Jordan Davis) commented his excitement to participate in the customized live video stream hosted by the content producer (i.e., Bob Porter).

In FIG. 4D, the graphical user interface 402 displays an updated graphic from the pre-roll animation 414. As mentioned above, a pre-roll animation can include multiple graphics, texts, and transitions that familiarize viewers with the topic of the themed experience. In some instances, the pre-roll animation can familiarize viewers with a single graphic.

Figure 4F:
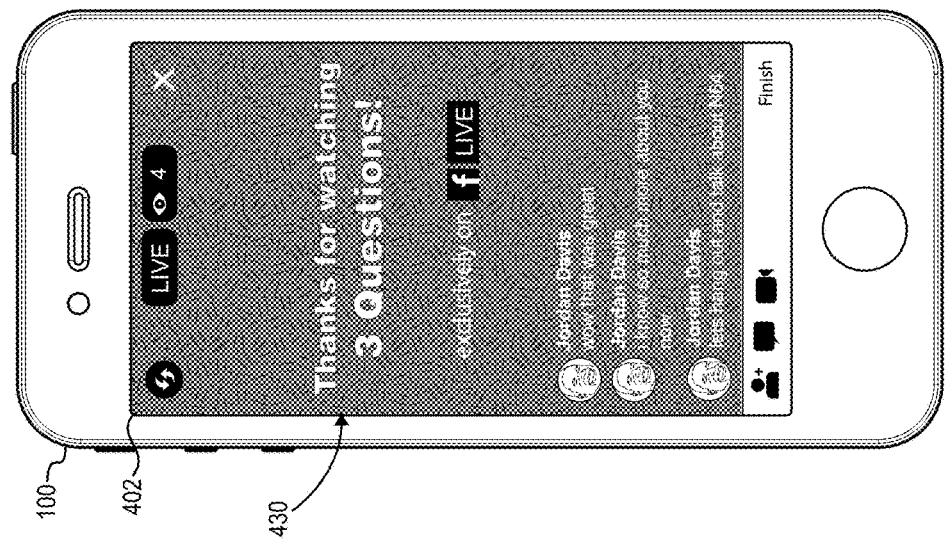
Figure 4E:
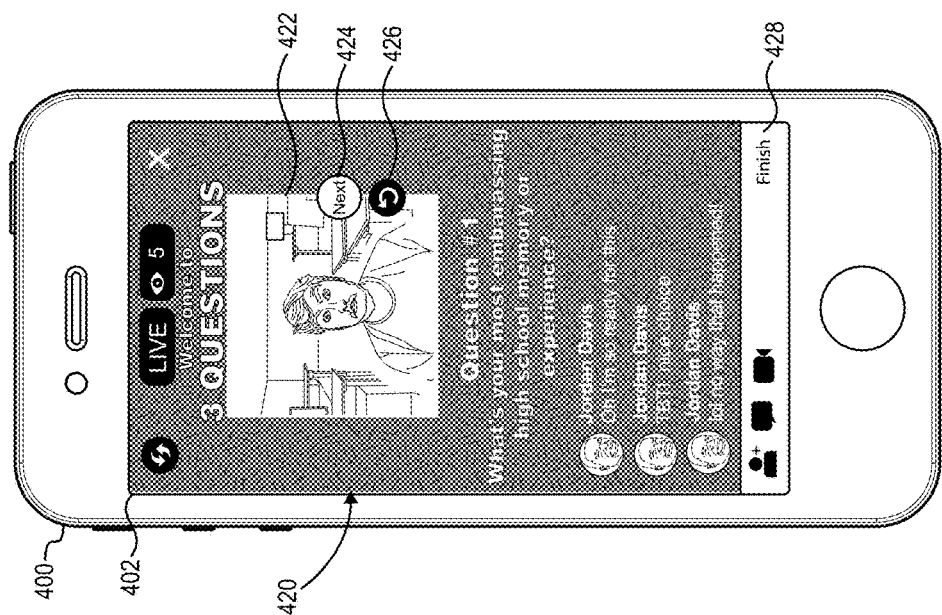

FIG. 4E illustrates the graphical user interface 402 displaying a themed overlay 420 over a live video stream. As shown, the content producer broadcasts a live image/sound capture 422, which the communications system overlays with graphics corresponding to the selected themed experience. In addition, like the pre-roll animation described above, the themed overlay 420 can include text that guides, based on the selected themed experience, the content producer through the customized live video stream. Thus, as shown, the themed overlay 420 displays a question for the content producer to answer in front of the viewers watching the customized live video stream.

The themed overlay 420, in some embodiments, automatically advances and updates based on the navigation flow of the selected themed experience. In other embodiments, the content producer can use selectable elements (visible only to the content producer) to progress through the customized live video stream. For example, in response to the content producer selecting the next button 424, the themed overlay 420 updates to show another question for the content producer to answer. In some instances, the content producer selects a refresh button 426 to pass on the current question and receive a new question. One will appreciate that the selectable options provided in connection with a themed overlay can vary according to the navigation flow of the selected themed experience.

When the content producer is ready to end the live video stream, the content producer can select an end broadcast option 428 (e.g., the "Finished" button) or another type of selectable element within the graphical user interface 402 of the content producer client device 400. Upon receiving the selection of the end broadcast option 428, the content producer client device 400 sends a termination request to the communications system. In response, the communications system transitions the live video stream from the themed overlay to the outro graphics sequence. Alternatively, the content producer client device 400 loads the outro graphics sequence.

FIG. 4F illustrates the graphical user interface 402 displaying an outro graphics sequence 430. As such, upon the content producer completing the structured themed experience, the graphical user interface 402 transitions to the outro graphics sequence 430. An outro graphics sequence provides the live video stream with a polished element that signals the conclusion of the live video stream. In general, an outro graphics sequence can include various graphics, animations, texts, credits, and/or audio clips.

In one or more embodiments, an outro graphics sequence prompts viewers to create their own live video stream using the same or another themed experience. For example, the outro graphics sequence displays one or more selectable elements that prompt the content producer to create another customized live video stream using the same themed experience or a different themed experience. Further, in some embodiments, the outro graphics sequence prompts a viewer to create their own customized live video stream using a themed experience.

Figure 5:
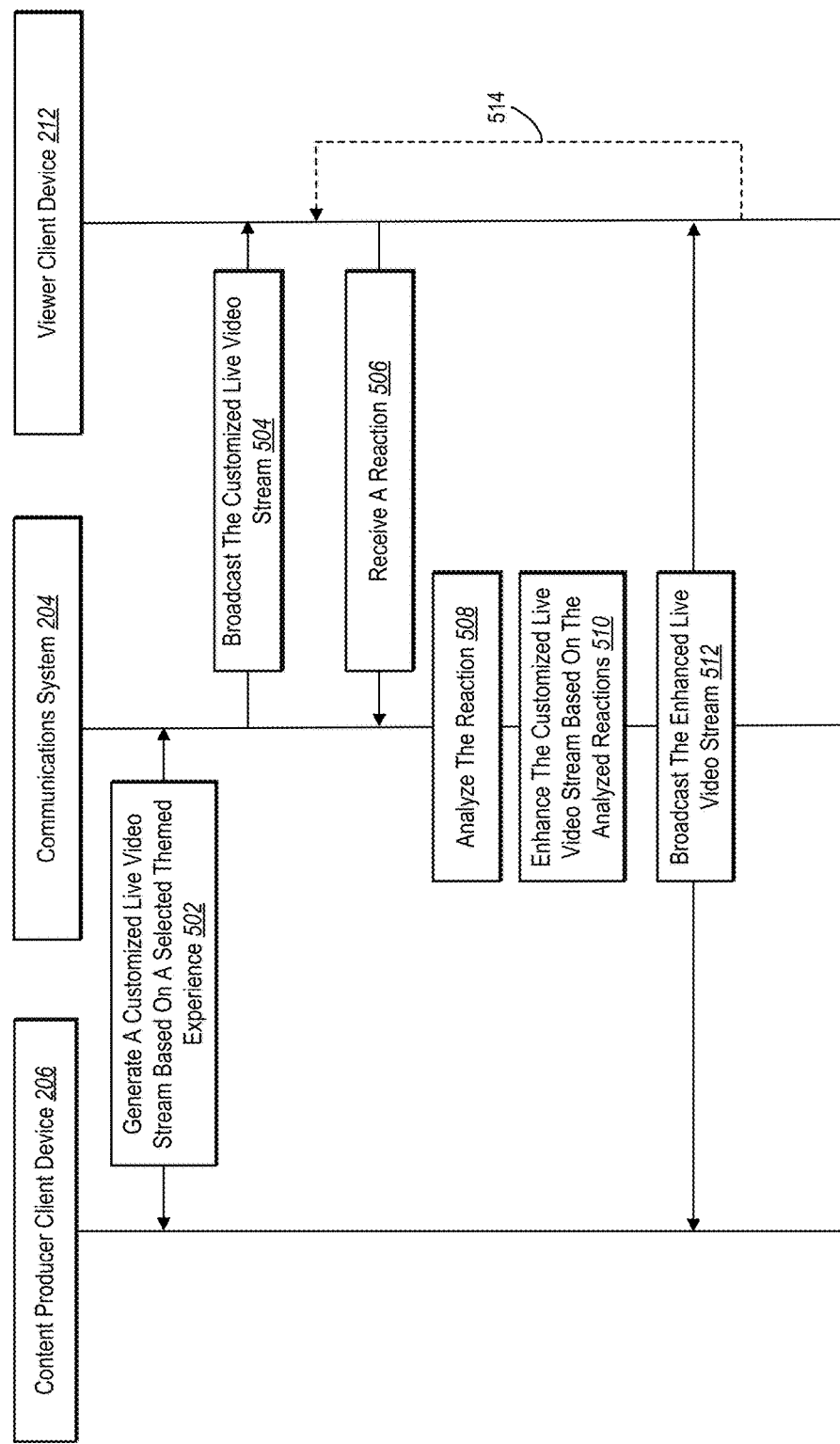
FIG. 5 illustrates a sequence diagram of enriching a live video stream with one or more digital enhancements in accordance with one or more embodiments described herein.

FIG. 5 illustrates a sequence diagram of enriching a live video stream with one or more digital enhancements. As shown, FIG. 5 includes a communications system 204, a content producer client device 206, and a viewer client device 212. The communications system 204, the content producer client device 206, and the viewer client device 212 shown in FIG. 5 can be the same or similar components as those described with respect to FIG. 2 above. For example, the server device 202 in the communications environment 200 hosts the communications system 204.

As illustrated, the communications system 204, in connection with the content producer client device 206, generates 502 a customized live video stream based on a selected themed experience. Further, the communications system 204 broadcasts 504 the customized live video stream to a viewer client device 212. In one or more embodiments, the actions of generating 502 and broadcasting 504 represent the actions of generating 316 and broadcasting 318 the customized live video stream described above in connection with FIG. 3. Thus, in the one or more embodiments, FIG. 5 is a continuation of the actions described above with respect to FIG. 3. Alternatively, the actions in FIG. 5 can occur separately from the actions described above with respect to FIG. 3.

Upon broadcasting the customized live video stream to one or more viewers via corresponding viewer client devices, the communications system 204 receives 506 an engagement signal from a viewer client device 212. Examples of engagement signals include comments, "likes," emoji, positive indications, neutral/indifferent indications, and negative indications. For instance, a viewer selects a heart emoji in response to the content producer's customized live video stream, which represents a positive engagement signal. As such, the viewer client device 212 detects the engagement signals and provides the engagement signal to the communications system 204. In another instance, the viewer client device sends a comment, provided by a content producer viewing the live video stream, to the communications system 204.

The communications system 204, upon receiving the engagement signal, analyzes 508 the engagement signal. Analyzing an engagement signal includes identifying and classifying the engagement type. Based on the engagement type, the communications system 204 can perform one or more actions. For example, if the engagement signal is positive (e.g., "like," "love," or a happy emoji), the communications system 204 increments a count of total positive engagement signals for the customized live video stream. In some instances, if the engagement signal is not positive (e.g., a negative or angry emoji), the communications system 204 can decrement the positive engagement signal count or increment a negative engagement signal count.

In one or more embodiments, the communications system 204 weights engagement signals differently. For example, the communications system 204 increments the positive engagement signal count by one for each "like;" for each "love" or "LOL" engagement signal, the communications system 204 increments the positive engagement signal count by three. In alternative, and/or additional embodiments, the communications system 204 maintains a separate count for each type of engagement signal (e.g., "like" and "loves" are tracked separately). Further, in some embodiments, the communications system 204 maintains a total count from all engagements signal types (e.g., positive, neutral, and negative).

As mentioned above, engagement signals can include comments from viewers. As such, upon the communications system 204 receiving comments from a viewer client device 212, the communications system 204 analyzes the comment to determine whether the comment carries a positive, neutral, or negative context. Further, the communications system 204 analyzes the comment to identify keywords and/or other triggers that correspond to the themed experience used in the customized live video stream. For example, if the context of a themed experience is a sing-a-long/lip-sync, then the communications system 204 can detect comments directed toward the content producer singing or the song itself.

Based on analyzing the engagement signal, the communications system 204 enhances 510 the customized live video stream. Specifically, the communications system 204 can overlay one or more digital enhancements based on the type, context, and/or assessment of the engagement signal. Examples of digital enhancements include graphics, audio clips, animations, stickers, icons, filters, masks, and layout changes that the communications system 204 incorporates into the customized live video stream. As part of overlaying a themed experience on a live video stream, the communication system 204 can combine the digital enhancement with the live video stream in a single media stream, either as a merged media stream or as metadata associated with the media stream.

As an example, the communications system 204 provides a digital enhancement when the content producer receives a threshold number of engagement signals in a customized live video stream. For instance, for each set of ten positive engagement signals the content producer receives in a customized live video stream, the communications system 204 overlays a Hawaiian lei (i.e., digital enhancement) to the image of the content producer within the customized live video stream. In another instance, the communications system 204 overlays awards when the content producer reaches various thresholds, such as overlaying a "Funny Man" trophy when the content producer receives 25 LOL engagement signals or a "100 Likes Badge" when the content producer receives one-hundred "likes."

In another example, the communications system 204 provides one or more digital enhancements based on the analyzed comments of a customized live video stream. For instance, the communications system 204 detects that one or more comments related to the themed experience applied to the customized live video stream. In response, the communications system 204 modifies or updates the design of the themed experience to reflect the comments. In this manner, in one or more embodiments, the communications system 204 allows interactions by the viewers to influence the scene and setting of the themed experience applied to the customized live video stream.

In addition to providing digital enhancements based on engagement signals, the communications system 204, in one or more embodiments, applies one or more digital enhancements to a customized live video stream when a content producer reaches various milestones. For example, the communications system 204 overlays or upgrades a digital enhancement to a customized live video stream each time the content producer reaches a threshold number of viewers. For instance, when the content producer reaches twenty viewers, the communications system 204 overlays a mask to the viewer. Then for each additional ten viewers, the communications system 204 rewards the content producer by adding additional features to the mask. Likewise, the communications system 204 can award the content producer for reaching time interval milestones, such as broadcasting for three minutes, five minutes, ten minutes, thirty minutes, one hour, etc.

In one or more embodiments, the communications system 204 selects a digital enhancement based on activity data of the content producer and/or viewers. For example, if the content producer and viewers share a common interest, the communications system 204 overlays a sticker or another digital enhancement relating to that common interest. As a second example, if the content producer is broadcasting from a recognized location, communications system 204 overlays a digital enhancement corresponding to the recognized location. In another example, the communications system 204 identifies one or more keywords from the comments, the communications system 204 overlays a digital enhancement that aligns with the keywords.

In some embodiments, the communications system 204 applies digital enhancements to a customized live video stream to increase viewership and/or encourage the content producer to continue the customized live video stream. For example, if the number of viewers begins to decline, the communications system 204 overlays one or more digital enhancements to the customized live video stream to retain current viewers and/or draw in additional viewers. Likewise, if the communications system 204 detects a decline in the customized live video stream by the content producer, the communications system 204 can overlay a one or more digital enhancements to further motivate the content producer to continue broadcasting.

Besides overlaying digital enhancements on a local live video stream basis, in some embodiments, the communications system 204 provides digital enhancements when the content producer reaches global milestones. For example, the communications system 204 displays a badge when a content producer reaches 500 views or 1,000 likes across multiple live video streams. The communications system 204 can display the digital enhancement within a subsequent live video stream or in connection with the content producer's profile. Further, the communications system 204 can unlock additional themed experiences when the content producer reaches a local or global milestone.

Returning to FIG. 5, upon the communications system 204 enhancing the customized broadcast with one or more digital enhancements, the communications system 204 broadcasts 512 the enhanced live video stream to both the content producer client device 206 and the viewer client device 212. In this manner, the communications system 204 provides the enhanced live to both the content producer and the viewers. In some embodiments, the communications system 204 also provides a notification, such as in line with the comments, indicating that a digital enhancement has been applied and/or the reasoning for why the digital enhancement was applied.

The communications system 204 can apply multiple digital enhancements to a customized and/or enhanced live video stream. For example, the communications system 204 can repeat (shown as dashed line 514) the actions of receiving 506 engagement signals, analyzing 508 the engagement signals, enhancing 510 the customized live video stream based on the analyzed engagement signal, and broadcasting 512 the enhanced live video stream.

Each time the communications system 204 applies a digital enhancement, the communications system 204 can add to, replace, modify, or remove a previous digital enhancement. For example, as mentioned above, the communications system 204 overlays an additional Hawaiian lei to the image of the content producer each time the content producer reaches a new milestone of positive engagement signals. In a second example, the communications system 204 replaced a "10 Likes" badge with a "25 Likes" badge upon the content producer receiving an addition fifteen likes for a live video stream. As another example, the communications system 204 alternates between overlaying a halo and horns on the image of the content producer based on the last detected keyword in the comments from viewers. One will appreciate that the communications system 204 can apply and/or display various digital enhancements based on engagement signals provided by viewers or upon the content producer reaching milestones, as described above.

FIGS. 6A-6D illustrate example graphical user interface views of overlaying digital enhancements onto a live video stream. As shown, FIGS. 6A-6D each includes a content producer client device 600 and a graphical user interface 602 displaying a live video application. Further, the content producer client device 600 includes a camera and microphone that capture images and sounds in real-time. The content producer client device 600 can be an example embodiment of the content producer client device 206 described above.

FIG. 6A is similar to FIG. 4A described above. As such, FIG. 6A illustrates a content producer client device 600 displaying a list 604 of themed experiences 606a-c to the content producer of the content producer client device 600. As shown the list 604 includes a first themed experience 606a, a second themed experience 606b, and a third themed experience 606c. For purposes of explanation, the content producer selects the third themed experience 606c from the list 604 of themed experiences provided to the content producer.

In addition to selecting the third themed experience 606c, the content producer provides user input to set up a live video stream. For example, because the selected themed experience is that of a private tour guide, the communications system prompts the content producer to confirm his location (e.g., the University of Delaware Campus) such that the communications system can incorporate the location into the themed experience for the customized live video stream. The communications system 204 may prompt the content producer for additional preferences, such as the layout design template, length of the themed experience, and/or whether comments are permitted. Further, the communications system prompts the content producer to select one or more viewer to whom to send the live video stream. After the themed experience is set up, the content producer can provide input to start the customized live video stream and the communications system can begin broadcasting the live video stream.

Upon initiating the broadcast of the customized live video stream, the graphical user interface 602 of the content producer client device 600 updates to display the selected themed experience. Thus, as FIG. 6B illustrates, the graphical user interface 602 displays the customized themed experience 608. The customized themed experience 608 includes a title of the themed experience (e.g., "Private Tour Guide"), a live image/sound capture 610 of the content producer, and an indication of the content producer's location (e.g., "University of Delaware Campus" and a map of the content producer's location).

The customized themed experience 608 also includes comments 618 from one or more viewers. As mentioned above, comments are one type of engagement signal that viewers can provide when watching a customized live video stream. As shown, when a viewer provides a comment, the communications system displays the comment as part of the live video stream. In some embodiments and as described above, the communications system analyzes comments and performs various enhancements based on the analyzed comments.

In addition to comments, viewers can react to the customized live video stream with positive, neutral, or negative engagement signals. To illustrate, FIG. 6C shows positive engagement signals 612 in the form of emoji over the customized live video stream. In particular, the communications system receives these positive engagement signals from viewer client device of viewers and, in response, displays the engagements over the customized live video stream.

Based on the number and quality of engagement signals, the communications system 204 enhances the customized live video stream with one or more digital enhancements. For example, FIG. 6D illustrates the communications system adding overlays to the live video stream. In particular, FIG. 6D illustrates adding a hat overlay 614 and a sunglasses overlay 616 to the content producer's image in the live video stream. For instance, the communications system overlays the hat 614 to the content producer for achieving ten viewers and the sunglasses 616 for reaching 30 positive engagement signals. In addition, as mentioned above, the communications system also provides an indication 620 in line with the comments 618 awarding the content producer for his achievements.

In one or more embodiments, the communications system 204 tracks the content producer's image movements within the enhanced live video stream to ensure that the digital enhancements applied to the content producer are properly placed within the enhanced live video stream. Stated differently, the communications system 204 updates the position of the overlaid digital enhancements as the content producer changes positions within the enhanced live video stream. For example, the communications system 204 hides the hat 614 and sunglasses 616 on the content producer when the content producer moves out of frame and again shows the hat 614 and sunglasses 616 when the content producer re-enters the frame. One will appreciate that the communications system 204 may employ various image analyzing and tracking techniques to overlay digital enhancements within an enhanced live video stream.

As noted above, in one or more embodiments, the communications system 204 overlays a digital enhancement based on activity data of the content producer and/or viewers. In the illustrated embodiment of FIG. 6D, the communications system 204 overlays a hat 614 (that is on backwards) and sunglasses 616, which appropriately suit the content producer's age, interests, and selected themed experience. However, if the content producer was from a different demographic, the communications system 204 could overlay a safari hat and binoculars to the image of the user.

Figure 7:
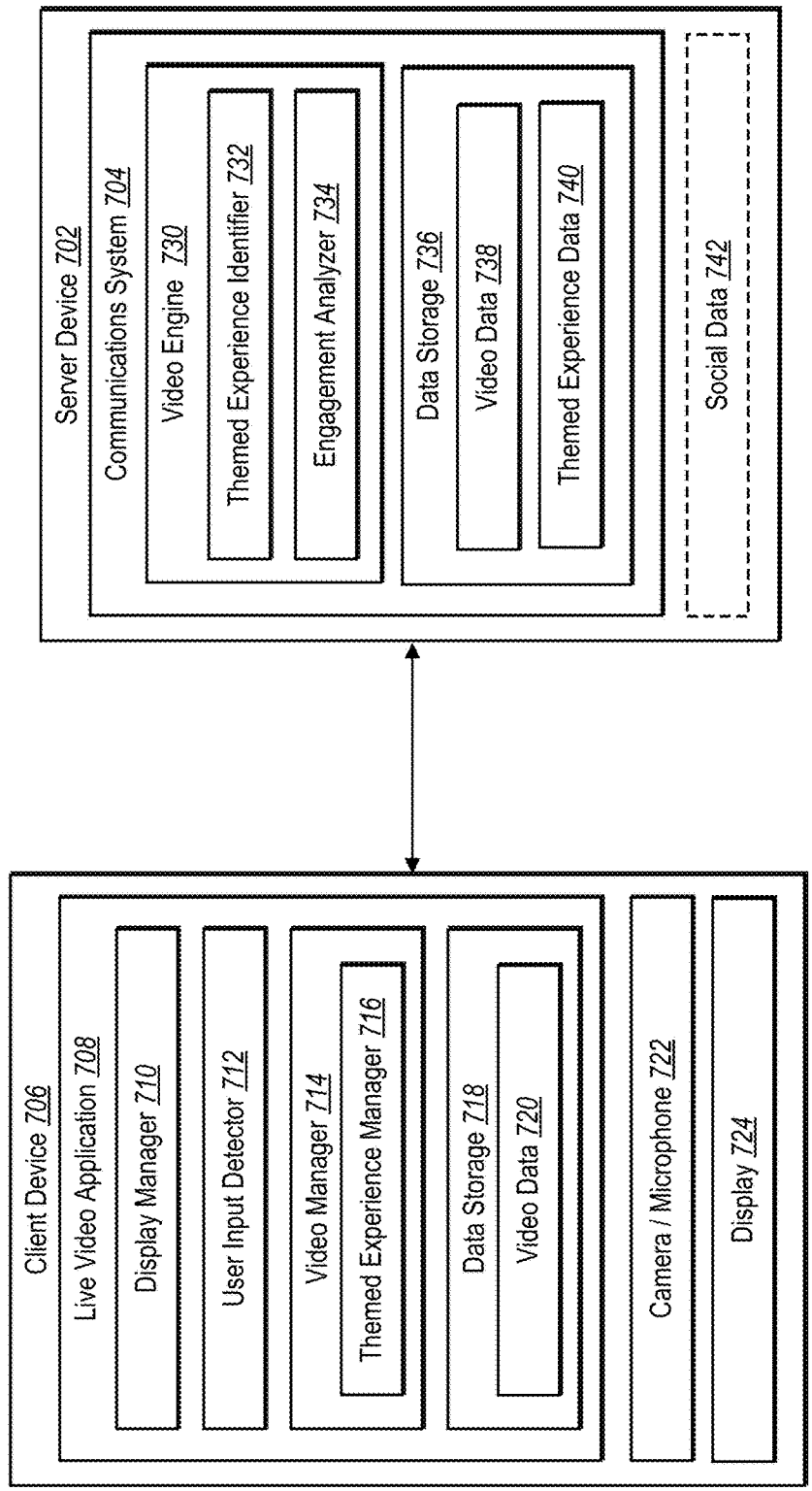
FIG. 7 illustrates a schematic diagram of a communications system and a client device in accordance with one or more embodiments described herein.

FIG. 7 illustrates an example schematic diagram of a communications system 704 in communication with a client device 706. The communications system 704 and the client device 706 described in FIG. 7 can be example embodiments of the communications system 204 and the client devices (e.g., the content producer client device 206 and/or the viewer client device 212) described in connection with the preceding figures. For example, the client device 706 is a mobile client device that a user employs to capture, share, and view live video stream within the communications system 704.

As FIG. 7 illustrates, the client device 706 includes a live video application 708, which includes a display manager 710, a user input detector 712, a video manager 714 including a themed experience manager 716, and a data storage 718 including video data 720. Additionally, the client device 706 includes a camera/microphone 722 and a display 724.

The components 710-720 of the live video application 708 can comprise software, hardware, or both. For example, the components 710-720 can comprise one or more instructions stored on a computer-readable storage medium and executable by processors of one or more computing devices, such as a client device or server device. When executed by the one or more processors, the computer-executable instructions of the live video application 708 can cause the computing device(s) to perform the feature learning methods described herein. Alternatively, the components 710-720 can comprise hardware, such as a special purpose processing device to perform a certain function or group of functions. Alternatively, the components 710-720 of the live video application 708 can comprise a combination of computer-executable instructions and hardware.

In one or more embodiments, the live video application 708 is a native application installed on the client device 706. For example, the live video application 708 is a mobile application that installs and runs on a mobile device, such as a smart phone or a tablet computer. Alternatively, the live video application 708 can be a desktop application, widget, or another form of a native computer program. Furthermore, the live video application 708 may be a remote application accessed by the client device 706. For instance, the live video application 708 is a web application executed within a web browser of the client device 706.

As mentioned above, and as shown in FIG. 7, the live video application 708 includes a display manager 710. The display manager 710 provides, manages, and/or controls a graphical user interface that allows a user of the client device 706 to interact with features of the communications system 704. For example, the display manager 710 generates the graphical user interface from a plurality of graphical components, objects, and/or elements that allow a user to engage with the live video application 708. In particular, the display manager 710 enables a user to create, share, and view live video streams.

The display manager 710 also facilitates the input of text or other data for the purpose of interacting with one or more features of the live video application 708. For example, the display manager 710 provides a user interface that includes a touch display keyboard. A user can interact with the touch display keyboard using one or more touch gestures to input text to be included in a live video stream. For instance, a user can use the touch display keyboard to input various characters, symbols, icons, or other information.

As further illustrated in FIG. 7, the live video application 708 includes a user input detector 712. In one or more embodiments, the user input detector 712 detects, receives, and/or facilitates user input in any suitable manner. In some instances, the user input detector 712 detects one or more user interactions (e.g., a single interaction, or a combination of interactions) with respect to the user interface. For example, the user input detector 712 detects a user interaction from a keyboard, mouse, touch page, touch screen, and/or any other input device.

The user input detector 712 may additionally, or alternatively, receive data representative of a user interaction. For example, the user input detector 712 may receive one or more user-configurable parameters from a user, one or more commands from the user, and/or any other suitable user input. The user input detector 712 may receive input data from one or more components of the social networking system, or from one or more remote locations.

The live video application 708 performs one or more functions in response to the user input detector 712 detecting user input and/or receiving other data. Generally, a user can control, navigate within, and otherwise use the live video application 708 by providing one or more user inputs that the user input detector 712 detects. For example, in response to the user input detector 712 detecting user input, one or more components of the live video application 708 allow a user to select a themed experience from a list of themed experiences. In another example, in response to the user input detector 712 detecting user input, one or more components of the live video application 708 allow the user to interact with a live video stream (e.g., react to a live video stream).

As also illustrated in FIG. 7, the live video application 708 includes a video manager 714. In general, the video manager 714 handles all activities necessary for broadcasting and viewing a live video stream. For example, when the client device 706 is broadcasting a live video stream, the video manager 714 interfaces with the camera/microphone 722. For instance, the client device 706 directs the capture of the live video stream from one or more cameras associated with the client device 706. Similarly, when the client device 706 is receiving a live video stream, the video manager 714 interfaces with the display 724. For example, the video manager 714 interfaces with one or more displays 724 in order to display a live video stream received from the communications system 704.

Additionally, the video manager 714 communicates with the communications system 704 in order to provide and/or receive a live video stream. For example, the video manager 714 initiates a live video link or connection with the communications system 704, which enables the communications system 704 to receive a live video stream captured by the client device 706 in real-time. Likewise, when receiving a live video stream, the video manager 714 establishes a live video link or connection with the communications system 704, which enables the communications system 704 to provide a live video stream to the client device 706 in real-time.

As shown, the video manager 714 also includes a themed experience manager 716. In general, the themed experience manager 716 facilitates the display, selection, and application of themed experiences into live video streams. For example, the themed experience manager 716 receives a list of themed experiences to provide to a user. In connection with the display manager 710 and the display 724, the themed experience manager 716 displays the list to the user on the client device 706 within the live video application 708. The user input detector 712 then provides the themed experience manager 716 with a selection of a themed experience by the user. Next, the themed experience manager 716 applies the themed experience to a live video stream.

In some embodiments, the themed experience manager 716 applies a selected themed experience to a live video stream in connection with the communications system 704. Further, the themed experience manager 716, in some embodiments, overlays digital enhancements to a live video stream provided by the communications system 704. The previous and other functions of the themed experience manager 716 are further described above with respect to the preceding figures.

As shown in FIG. 7, and as mentioned above, the live video application 708 also includes data storage 718. The data storage 718 includes video data 720, such as live video streams and stored live video streams. In one or more embodiments, the video data 720 is representative of video information, as described herein. Further, in some embodiments, the data storage 718 stores one or more themed experiences on the client device 606 such that the live video application can directly apply a selected themed experience to a live video stream, including one or more customized inputs by a user.

The client device 706 also includes camera/microphone 722 and a display 724. For example, in one or more embodiments the client device 706 includes at least one camera (e.g., a smart phone camera or tablet computer camera), at least one microphone, and at least one display (e.g., a touch screen display). The camera, microphone, and/or display can be built-in, or a peripheral device attached to the client device 706. In additional embodiments, the client device 706 can include multiple cameras, microphones, and/or displays.

As shown in FIG. 7, and as mentioned above, the communications system 704 is hosted by a server device 702. In some embodiments, however, multiple server devices host the communications system 704. In general, the communications system 704 provides live video streams, including customized and/or enhanced live video stream to one or more content producers of the communications system 704. As shown in FIG. 7, the communications system 704 includes a video engine 730 including a themed experience identifier 732 and an engagement analyzer 734, and a data storage 736 including video data 738 and themed experience data 740. The communications system 704 can optionally include social data 742.

Each of the components 730-740 of the communications system 704 can be implemented using a computing device including at least one processor executing instructions that cause the communications system 704 to perform the processes described herein. In some embodiments, the components 730-740 can be implemented by the server device 702, or across multiple server devices. Moreover, the components 730-740 described herein can comprise a combination of computer-executable instructions and hardware.

The video engine 730, handles all activities associated with live video streams. For example, the video engine 730 detects the initiation of a live video stream from the client device 706. Furthermore, the video engine 730 provides the client device 706 with access to a live video stream from a viewer of the communications system 704.

As mentioned above, the video engine 730 includes a themed experience identifier 732 and an engagement analyzer 734. In general, the themed experience identifier 732 identifies one or more themed experiences from a collection of available themed experiences to provide to a user. In particular, and as described above, the themed experience identifier 732 analyzes user characteristics from each themed experience alongside a user's activity data to determine the one or more themed experiences to provide to the user. In some embodiments, the themed experience identifier 732 also prioritizes or ranks the themed experiences determined for a user. For example, the themed experience identifier 732 prioritizes themed experiences determined for a user based on how closely a themed experience's user characteristics fit with the user's activity data. The previous and other functions of the themed experience identifier 732 are further described above in connection with the preceding figures.

The engagement analyzer 734, in general, identifies engagement signals from viewers viewing a user's live video stream. As such, the engagement analyzer 734 determines when one or more engagement signals qualify a user to receive a digital enhancement to his or her live video stream. For example, the engagement analyzer 734 overlays a digital enhancement to a user's live video stream when the user reaches a threshold number of positive engagement signals. In some embodiments, the engagement analyzer 734 also provides a digital enhancement to a user's live video stream when the user reaches a broadcasting milestone. The previous and other functions of the themed engagement analyzer 734 are further described above in connection with the preceding figures.

As shown in FIG. 7, and as mentioned above, the communications system 704 also includes data storage 736. The data storage 736 includes video data 738, such as live video streams and stored live video streams. In one or more embodiments, the video data 738 is connected to the video data 720 maintained by the client device 706. In other words, the communications system 704 and the client device 706 communicate with each other to store and retrieve live video streams for a user.

Further, as shown, the data storage 736 includes themed experience data 740. Examples of themed experience data 740 include curated themed experiences, which the communications system 704 obtains for one or more third parties or curators. In particular, the themed experience data 740 includes graphics, sequences, themes, audio clips, and instructions relating to each themed experience. For example, the themed experience data 740 for a themed experience includes an introductory pre-roll graphics sequence, a themed overlay, and an outro graphics sequence.

In one or more embodiments, the communications system 704 includes social data 742. Social data can include user profile data and social connections between users of the communications system 704. For example, social data 742 includes user profile information, such as personal information about a user (e.g., name, gender, age, birth date, hometown, etc.), contact information (e.g., residence address, mailing address, current city, email addresses, phone numbers, screen names, etc.), and family and relationship information (e.g., married to, engaged to, partners with, parents of, siblings of, children of, cousin of, friends of relationship with, etc.).

In addition, and as mentioned above, in some embodiments, the communications system 704 is part of a social networking system. For example, the communications system 704 facilitates enhanced live video streams between users of a social networking system. Further details with respect to a social networking system are presented below with respect to FIGS. 10-11.

FIGS. 1A-7, the corresponding text, and the examples, provide a number of different methods, systems, and devices for enhancing live video streams by employing using themed experiences (i.e., live video templates) that guide a user through the process of creating and sharing a quality live video stream. In addition to the foregoing, one or more embodiments can also be described in terms of flowcharts comprising acts in a method for accomplishing a particular result. For example, FIG. 8 may be performed with more or fewer acts. Further, the acts may be performed in differing orders. Additionally, the acts described herein may be repeated or performed in parallel with one another or in parallel with different instances of the same or similar acts.

Figure 8:
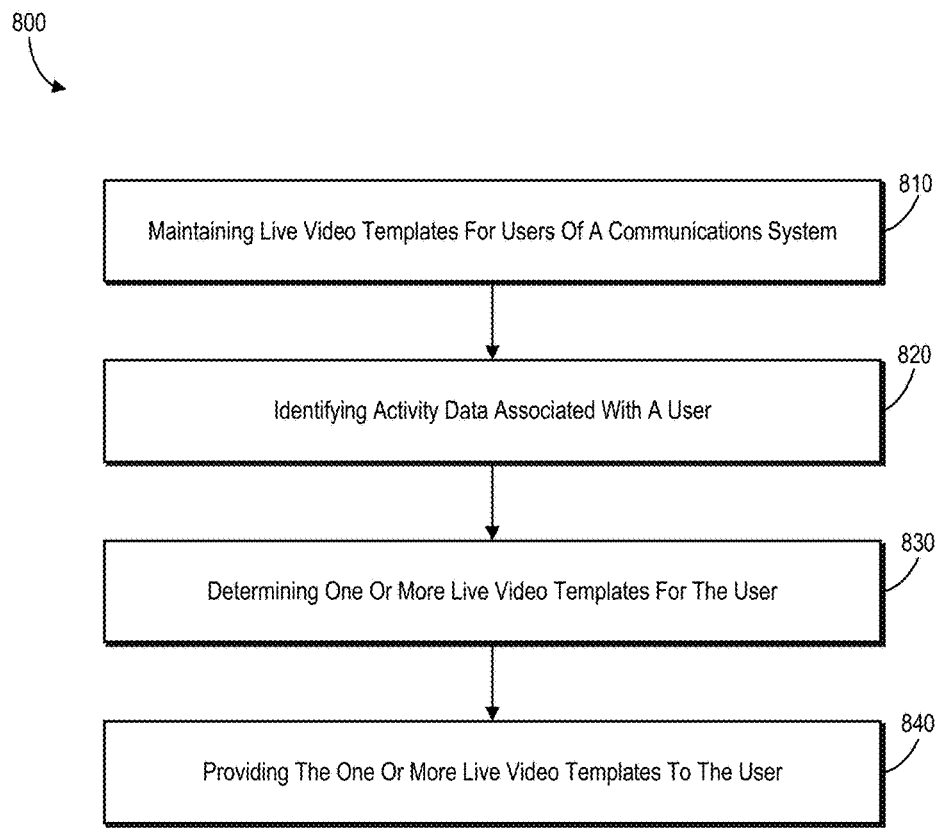
FIG. 8 illustrates a flowchart of a method of generating themed experiences for a content producer of the communications system in accordance with one or more embodiments described herein.

FIG. 8 illustrates a flowchart of a method 800 for generating live video templates for a user of the communications system. In one or more embodiments, the communications system 204, 704 described herein performs the method 800. For example, a communications system 204 operating on the server device 202, 702 performs the method 800. Alternatively, the communications system 204, 704 performs the method 800 in connection with one or more client devices 206, 212, 706.

The method 800 includes an act 810 of maintaining live video templates for users of a communications system. In particular, the act 810 may involve maintaining, for a plurality of users of a communications system, a plurality of live video templates that provides a guide for live video streams broadcasted to viewers of the communications system. In one or more embodiments, the communications system facilitates live video streams within a social networking system. In some embodiments, at least one live video templates of the plurality of live video templates guides a user through the live video stream using a pre-roll graphics sequence, a themed overlay, and an outro graphics sequence for the live video stream.

The method 800 also includes an act 820 of identifying activity data associated with a user. In particular, the act 820 may involve identifying activity data on the communications system associated with a user of the plurality of users. In one or more embodiments, the activity data on the communications system associated with the user includes data associated with previous live video streams of the user including a number of previous live video streams by the user, a number of viewers for the previous live video streams, and durations of the previous live video streams. In some embodiments, the activity data on the communications system associated with the user includes demographic information of the user, social data of the user, interests of the user, or interests of potential viewers of a live video stream, client device data of the user, trending live video templates, or age of each live video template in the plurality of live video templates.

In addition, the method 800 includes an act 830 of determining one or more live video templates for the user. In particular, the act 830 may involve determining, for the user, one or more live video templates of the plurality of live video templates based on the activity data on the communications system associated with the user. In one or more embodiments, the act 830 includes customizing, specific to the user, an order of the one or more live video templates based on the activity data on the communications system associated with the user.

Further, in some embodiments, the act 830 also involves identifying one or more user characteristics for each live video template of the one or more live video templates and determining the one or more live video templates for the user based on correlating the one or more identified user characteristics of each live video template with the activity data on the communications system associated with the user. In some embodiments, customizing the order of the one or more live video templates includes ordering the one or more live video templates based on a correlation score determined from the correlation between the one or more user characteristics for each live video template and the activity data on the communications system associated with the user.

The method 800 also includes an act 840 of providing the one or more live video templates to the user. In particular, the act 840 may involve providing, to a client device associated with the user, the one or more live video templates to guide the user through a live video stream broadcasted from the client device. In some embodiments, the act 840 also includes providing the one or more live video templates in the order customized for the user.

The method 800 can also include one or more additional acts. For example, the method 800 includes the acts of receiving, from a client device associated with the user, a selection of a live video template from the one or more live video templates, receiving, from the client device associated with the user, user input associated with the selected live video template, customizing the live video stream based on the content user input and the selected live video template, and providing, via the communications system, the live video stream to one or more viewer client devices associated with one or more viewers of the communications system.

As another example, the method 800 includes the acts of receiving, from a client device associated with the user, a live video stream that applies a live video template selected from the one or more live video templates, providing the live video stream to one or more viewer client devices associated with one or more viewers of the communications system, receiving, from the one or more viewer client devices, engagement signals to the live video stream, and overlaying, in response to receiving the engagement signals, one or more digital enhancement signals to the live video stream.

In one or more embodiments, overlaying the one or more digital enhancements to the live video stream includes identifying an image of the user within the live video stream using image recognition and overlaying the one or more digital enhancements over the image of the user. In some embodiments, overlaying the one or more digital enhancements to the live video stream further includes tracking image movements of the identified image of the user within the live video stream and updating positions of the one or more digital enhancements based on the tracked image movements to be over the image of the user.

Figure 9:
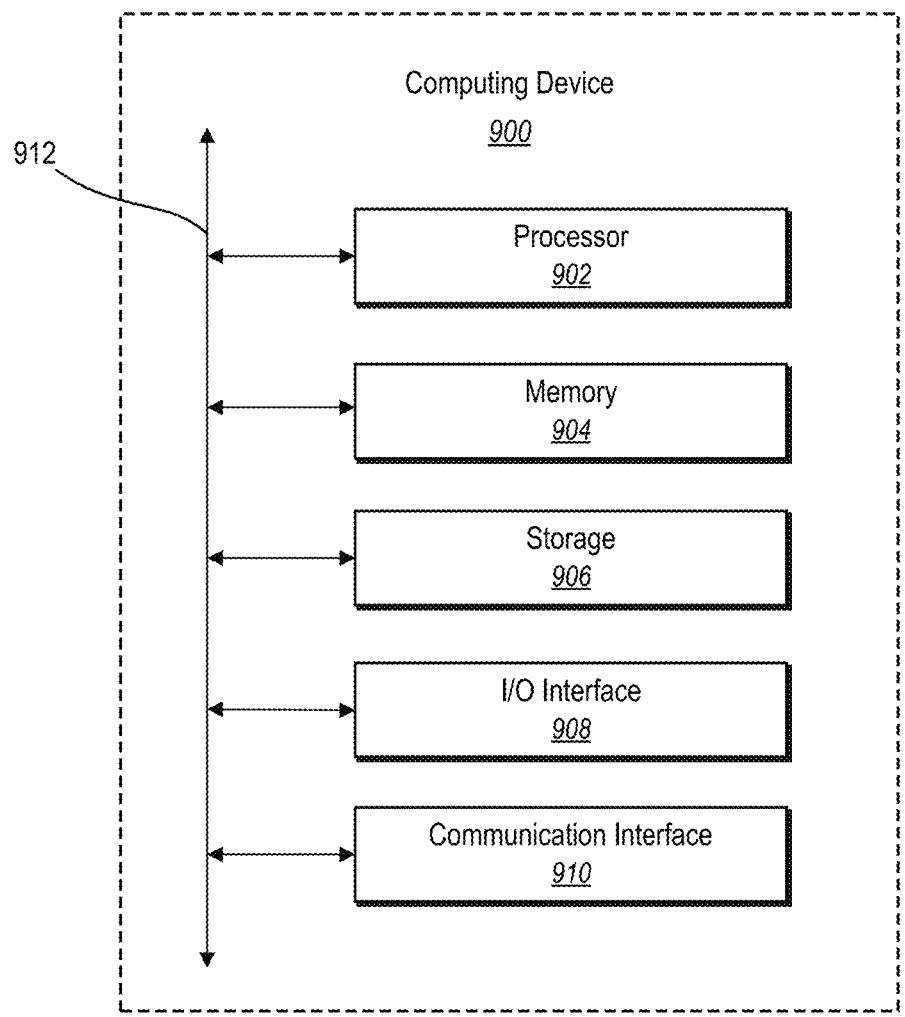
FIG. 9 illustrates a block diagram of a computing device in accordance with one or more embodiments described herein.

FIG. 9 illustrates a block diagram of exemplary computing device 900 that may be configured to perform one or more of the processes described above. One will appreciate that the computing device 900 may represent one or more client devices or server devices, such as those described previously. Further, the computing device 900 may represent various types of computing devices. For example, the computing device 900 can include: a mobile device such as a mobile telephone, a smartphone, a PDA, a tablet, a laptop; a non-mobile device such as a desktop or server; or any other type of computing device.

As shown by FIG. 9, the computing device 900 can comprise a processor 902, a memory 904, a storage device 906, an input/output ("I/O") interface 908, and a communication interface 910, which may be communicatively coupled by way of a communication infrastructure 912. While an exemplary computing device 900 is shown in FIG. 9, the components illustrated in FIG. 9 are not intended to be limiting. Additional or alternative components may be used in other embodiments. Furthermore, in certain embodiments, the computing device 900 can include fewer components than those shown in FIG. 9.

In one or more embodiments, the processor 902 includes hardware for executing instructions, such as those making up a computer program. The memory 904 may be used for storing data, metadata, and programs for execution by the processor(s). The storage device 906 includes storage for storing data or instructions.

The I/O interface 908 allows a user (e.g., content producer or viewer) to provide input to, receive output from, and otherwise transfer data to and receive data from computing device 900. The I/O interface 908 may include a mouse, a keypad or a keyboard, a touchscreen, a camera, an optical scanner, network interface, modem, other known I/O devices or a combination of such I/O interfaces. The I/O interface 908 may also include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 908 is configured to provide graphical data to a display for presentation to a user. The graphical data may be representative of one or more graphical user interfaces and/or any other graphical content as may serve a particular implementation.

The communication interface 910 can include hardware, software, or both. In any event, the communication interface 910 can provide one or more interfaces for communication (such as, for example, packet-based communication) between the computing device 900 and one or more other computing devices or networks. As an example, the communication interface 910 may include a network interface controller (NIC) or network adapter for communicating with an Ethernet or other wire-based network or a wireless NIC (WNIC) or wireless adapter for communicating with a wireless network, such as a WI-FI. The communication infrastructure 912 may include hardware, software, or both that couples components of the computing device 900 to each other. As an example, the communication infrastructure 912 may include one or more types of buses.

As mentioned above, embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor receives instructions, from a non-transitory computer-readable medium, (e.g., memory, etc.), and executes those instructions, thereby performing one or more processes, including one or more of the processes described herein.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Computer-executable instructions comprise, for example, instructions and data which, when executed by a processor, cause a general-purpose computer, a special-purpose computer, or a special-purpose processing device to perform a certain function or group of functions. In some embodiments, a general-purpose computer executes computer-executable instructions, which turns the general-purpose computer into a special-purpose computer implementing elements of the disclosure.

Those skilled in the art will appreciate that the disclosure may be practiced in network computing environments with many types of computer system configurations. The disclosure may also be practiced in distributed system environments where local and remote computer systems, which are linked through a network, both perform tasks. Embodiments of the present disclosure can also be implemented in cloud computing environments. In this description, "cloud computing" is defined as a model for enabling on-demand network access to a shared pool of configurable computing resources.

As mentioned above, the communications system can be included in a social networking system. A social networking system may enable its users (such as persons or organizations) to interact with the system and with each other. The social networking system may, with input from a user, create and store in the social networking system a user profile associated with the user. As described above, the user profile may include demographic information, communication channel information, and information on personal interests of the user.

In more detail, user profile information may include, for example, biographic information, demographic information, behavioral information, the social information, or other types of descriptive information, such as work experience, educational history, hobbies or preferences, interests, affinities, or location. Interest information may include interests related to one or more categories, which may be general or specific. As an example, if a user "likes" an article about a brand of shoes, the category may be the brand.

The social networking system may also, with input from a user, create and store a record of relationships of the user with other users of the social networking system, as well as provide services (e.g. wall posts, photo-sharing, online calendars and event organization, messaging, games, or advertisements) to facilitate social interaction between or among users. Also, the social networking system may allow users to post photographs and other multimedia content items to a user's profile page (typically known as "wall posts" or "timeline posts") or in a photo album, both of which may be accessible to other users of the social networking system depending on the user's configured privacy settings. Herein, the term "friend" may refer to any other user of the social networking system with which a user has formed a connection, association, or relationship via the social networking system.

Figure 10:
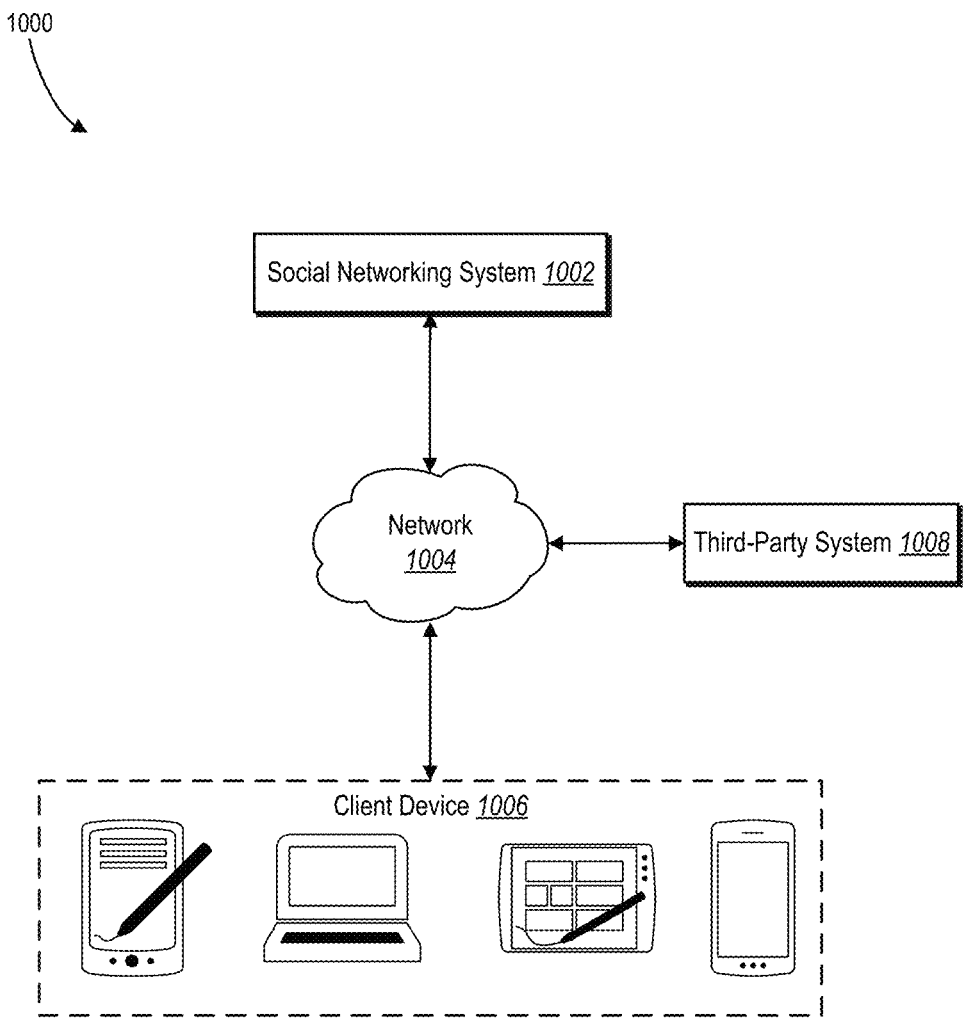
FIG. 10 illustrates a network environment of a social networking system in accordance with one or more embodiments described herein.

FIG. 10 illustrates an example network environment 1000 of a social networking system. The network environment 1000 includes a client device 1006, a social networking system 1002, and a third-party system 1008 connected to each other by a network 1004. Although FIG. 10 illustrates a particular arrangement of client device 1006, the social networking system 1002, the third-party system 1008, and the network 1004, this disclosure contemplates any suitable arrangement and number of client device 1006, the social networking system 1002, the third-party system 1008, and the network 1004.

Links may connect the client device 1006, the social networking system 1002, and the third-party system 1008 to the network 1004 or to each other. Links need not necessarily be the same throughout network environment 1000. One or more first links may differ in one or more respects from one or more second links.

In some embodiments, the client device 1006 may be an electronic device including hardware, software, or embedded logic components or a combination of two or more such components and capable of carrying out the appropriate functionalities implemented or supported by the client device 1006. As an example, a client device 1006 may include any of the computing devices discussed above in relation to FIG. 10. The client device 1006 may enable a network user at the client device 1006 to access the network 1004. The client device 1006 may enable its user to communicate with other users at other client devices or systems.

In some embodiments, the client device 1006 may include a web browser, such as and may have one or more add-ons, plug-ins, or other extensions. The client device 1006 may render a webpage based on the HTML files from the server for presentation to the user.

In some embodiments, the social networking system 1002 may be a network-addressable computing system that can host an online social network. The social networking system 1002 may generate, store, receive, and send social-networking data, such as, for example, user-profile data, concept-profile data, the social-graph information, or other suitable data related to the online social network. The social networking system 1002 may be accessed by the other components of the network environment 1000 either directly or via the network 1004.

In some embodiments, the social networking system 1002 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, etc., or any combination thereof.

In some embodiments, the social networking system 1002 may include one or more data stores. Data stores may be used to store various types of information. In some embodiments, the information stored in data stores may be organized according to specific data structures. Particular embodiments may provide interfaces that enable the client device 1006, the social networking system 1002, or the third-party system 1008 to manage, retrieve, modify, add, or delete, the information stored in data stores.

In some embodiments, the social networking system 1002 may store one or more social graph, described below. In one or more embodiments, the social networking system 1002 may provide users with the ability to take actions on various types of items or objects, supported by social networking system 1002. As an example, the items and objects may include groups or social networks to which users of the social networking system 1002 may belong, events or calendar entries in which a user might be interested, computer-based applications that a user may use, transactions that allow users to buy or sell items via the customer service, interactions with advertisements that a user may perform, etc. A user may also interact with anything that is capable of being represented in the social networking system 1002 or by an external system of the third-party system 1008, which is separate from the social networking system 1002 and coupled to the social networking system 1002 via the network 1004.

The social networking system 1002 can include a variety of stores, modules, and/or managers as described below. In one or more embodiments, a connection manager may be used for storing connection information about users. The connection information may indicate users who have similar or common work experience, group memberships, hobbies, educational history, or are in any way related or share common attributes. The connection information may also include user-defined connections between different users and content (both internal and external). An action-logging manager may be used to receive communications from a web server about a user's actions on or off the social networking system 1002. In conjunction with the action log, a third-party content object log may be maintained of user exposures to third-party content objects. An advertisement-pricing module may combine social information, the current time, location information, or other suitable information to provide relevant advertisements, in the form of notifications, to a user.

Authorization servers may be used to enforce one or more privacy settings of the users of the social networking system 1002. A privacy setting of a user determines how particular information associated with a user can be shared. The authorization server may allow users to opt in to or opt out of having their actions logged by the social networking system 1002 or shared with other systems (e.g., the third-party system 1008), such as, for example, by setting appropriate privacy settings.

In some embodiments, the third-party system 1008 may include one or more types of servers, one or more data stores, one or more interfaces, including but not limited to APIs, one or more web services, one or more content sources, one or more networks, or any other suitable components. The third-party system 1008 may be operated by a different entity from an entity operating the social networking system 1002 even if, in some embodiments, the social networking system 1002 and the third-party systems 1008 operate in conjunction with each other. In this sense, the social networking system 1002 may provide a platform, or backbone, which other systems, such as the third-party systems 1008, may use to provide social-networking services and functionality to users across the Internet.

In some embodiments, a third-party system 1008 may include a third-party content object provider. A third-party content object provider may include one or more sources of content objects, which may be communicated to the client device 1006. As an example, content objects may include information regarding things or activities of interest to the user. As another example, content objects may include incentive content objects.

Figure 11:
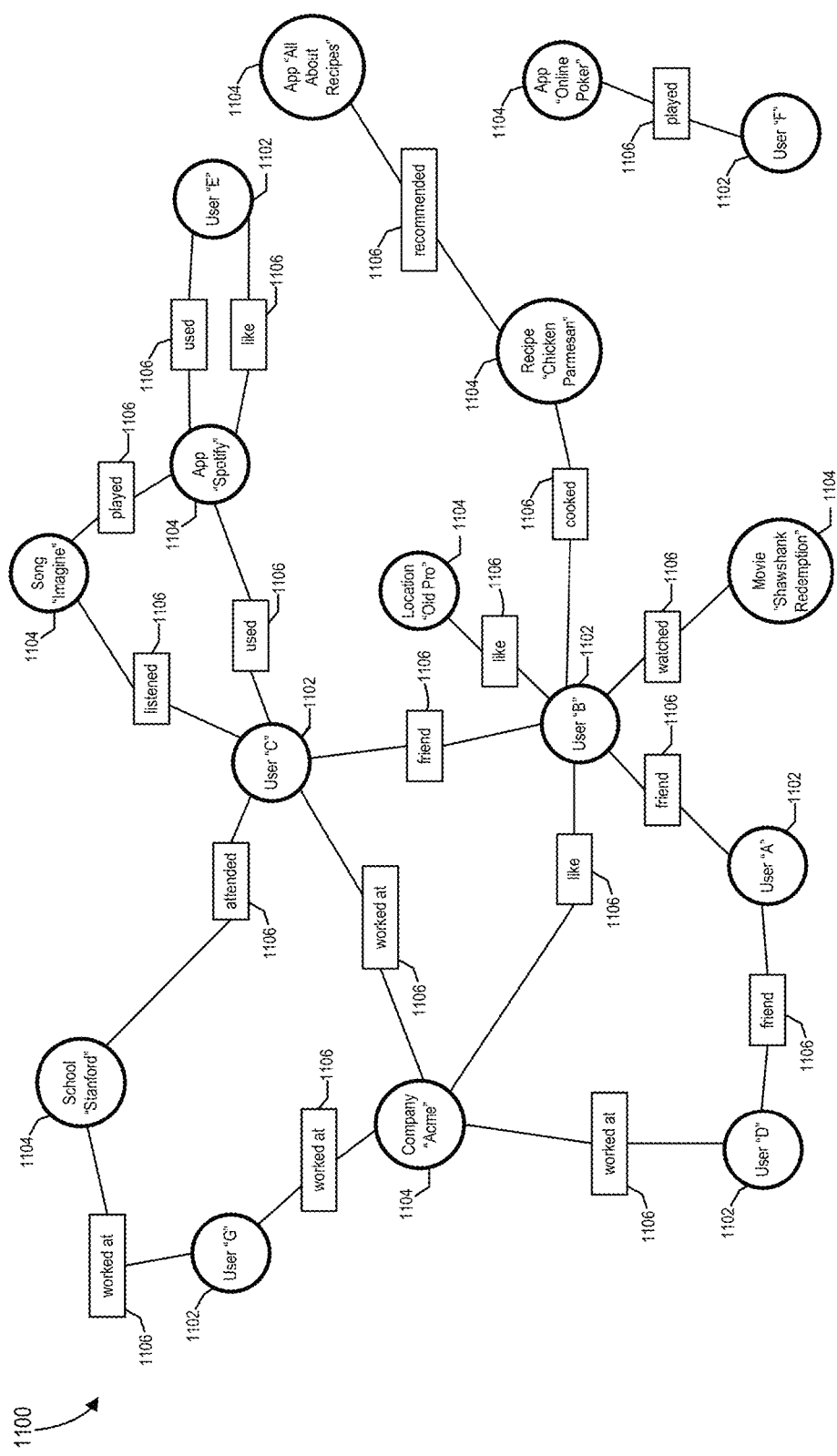
FIG. 11 illustrates an example social graph of a social networking system in accordance with one or more embodiments described herein.

FIG. 11 illustrates an example social graph 1100. In some embodiments, the social networking system 1002 may store one or more social graphs 1100 in one or more data stores. In some embodiments, the social graph 1100 may include multiple nodes—which may include multiple user nodes or multiple concept nodes—and multiple edges 1106 connecting the nodes. The social graph 1100 illustrated in FIG. 11 is shown, for didactic purposes, in a two-dimensional visual map representation.

In some embodiments, a user node 1102 may correspond to a user of social networking system 1002. When a user registers for an account with social networking system 1002, the social networking system 1002 may create a user node 1102 corresponding to the user, and store the user node 1102 in one or more data stores. Users and user nodes described herein may, where appropriate, refer to registered users and user nodes associated with registered users.

In some embodiments, a concept node 1104 may correspond to a concept. As an example, a concept may correspond to a place, a website, an entity, a resource, etc. A concept may be located within social networking system 1002 or on an external server. A concept node 1104 may be associated with information of a concept provided by a user or information gathered by various systems, including the social networking system 1002.

In some embodiments, a node in social graph 1100 may represent or be represented by an online profile page. Profile pages may be hosted by or accessible to social networking system 1002. Profile pages may be viewable by all or a selected subset of other users. As an example, a user node 1102 may have a corresponding user-profile page where the corresponding user may add content, make declarations, or otherwise express him or herself. As another example, a concept node 1104 may have a corresponding concept-profile page in which one or more users may add content, make declarations, or express themselves, particularly in relation to the concept corresponding to concept node 1104.

As an example, an edge 1106 may represent a friendship, family relationship, business or employment relationship, fan relationship, follower relationship, visitor relationship, sub scriber relationship, superior/subordinate relationship, reciprocal relationship, non-reciprocal relationship, another suitable type of relationship, or two or more such relationships.

In some embodiments, a pair of nodes in social graph 1100 may be connected to each other by one or more edges 1106. An edge 1106 connecting a pair of nodes may represent a relationship between the pair of nodes. In some embodiments, an edge 1106 may include or represent one or more data objects or attributes corresponding to the relationship between a pair of nodes. As an example, a first user may indicate that a second user is a "friend" of the first user. In response to this indication, the social networking system 1002 may send a "friend request" to the second user. If the second user confirms the "friend request," the social networking system 1002 may create an edge 1106 connecting the first user's user node 1102 to the second user's user node 1102 in social graph 1100 and store edge 1106 as social-graph information in one or more of data stores.

In some embodiments, an edge 1106 between a user node 1102 and a concept node 1104 may represent a particular action or activity performed by a user associated the with the user node 1102 toward a concept associated with the concept node 1104. As an example, as illustrated in FIG. 11, a user may "liked," "attended," "played," "listened," "cooked," "worked at," or "watched" a concept, each of which may correspond to an edge type or subtype.

In some embodiments, the social networking system 1002, the client device 1006, or the third-party system 1008 may access the social graph 1100 and related social-graph information for suitable applications. The nodes and edges of social graph 1100 may be stored as data objects, for example, in a data store (such as a social-graph database). Such a data store may include one or more searchable or queryable indexes of nodes or edges of social graph 1100.

In some embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition, or as an alternative, an advertisement may be one or more sponsored stories (e.g., a news feed or ticker item on the social networking system 1002).

An advertisement may also include social networking system functionality with which a user may interact. As an example, an advertisement may enable a user to "like" or otherwise endorse the advertisement by selecting an icon or link associated with an endorsement. In addition, or as an alternative, an advertisement may include social networking system context directed to the user. As an example, an advertisement may display information about a friend of the user within social networking system 1002 who has taken an action associated with the subject matter of the advertisement.

In some embodiments, the social networking system 1002 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 1008 or other suitable systems. An overall affinity for a social-graph entity for each user, subject matter, or type of content may be established. The overall affinity may change based on continued monitoring of the actions or relationships associated with the social-graph entity.

In some embodiments, the social networking system 1002 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions.

Coefficients may be used to predict any number of actions, which may be within or outside of the online social network. As an example, these actions may include various types of communications, such as sending messages, posting content, or commenting on content; various types of observation actions, such as accessing or viewing profile pages, media, or other suitable content; various types of coincidence information about two or more social-graph entities, such as purchasing a product from a merchant.

In some embodiments, the social networking system 1002 may use a variety of factors to calculate a coefficient. These factors may include, for example, user actions, types of relationships between objects, location information, other suitable factors, or any combination thereof. In some embodiments, different factors may be weighted differently when calculating the coefficient. The weights for each factor may be static, or the weights may change according to, for example, the user, the type of relationship, the type of action, the user's location, and so forth. Ratings for the factors may be combined according to their weights to determine an overall coefficient for the user.

To calculate the coefficient of a user towards a particular object, the rating assigned to the user's actions may comprise, for example, 60% of the overall coefficient, while the relationship between the user and the object may comprise 40% of the overall coefficient. In some embodiments, the social networking system 1002 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof.

A coefficient may include a decay factor that causes the strength of the signal provided by particular actions to decay with time, such that actions that are more recent are more relevant when calculating the coefficient. The ratings and weights may be continuously updated based on continued tracking of the actions upon which the coefficient is based. Any process or algorithm may be employed for assigning, combining, averaging, and so forth the ratings for each factor and the weights assigned to the factors. In some embodiments, the social networking system 1002 may determine coefficients using machine-learning algorithms trained on historical actions and past user responses, or data farmed from users by exposing them to various options and measuring responses.

In some embodiments, the social networking system 1002 may calculate a coefficient based on a user's actions. The social networking system 1002 may monitor such actions on the online social network, on the third-party system 1008, on other suitable systems, or any combination thereof. Typical user actions include viewing profile pages, creating or posting content, interacting with content, joining groups, listing and confirming attendance at events, checking-in at locations, liking particular pages, creating pages, and performing other tasks that facilitate social action.

In some embodiments, the social networking system 1002 may calculate a coefficient based on the user's actions with particular types of content. The content may be associated with the online social network, the third-party system 1008, or another suitable system. The social networking system 1002 may analyze a user's actions to determine whether one or more of the actions indicate an affinity for subject matter, content, other users, and so forth.

In some embodiments, the social networking system 1002 may calculate a coefficient based on the type of relationship between particular objects. Referencing the social graph 1100, the social networking system 1002 may analyze the number and/or type of edges 1106 connecting particular user nodes and concept nodes 1104 when calculating a coefficient. As an example, depending upon the weights assigned to the actions and relationships for the particular user, the overall affinity may be determined to be higher for content about a user's spouse than for content about a user's friend.

In some embodiments, the coefficient may be based on the degree of separation between particular objects. The degree of separation between any two nodes is defined as the minimum number of hops needed to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are not connected directly, but are connected through another user node (i.e., are second-degree nodes) may be described as "friends of friends." The lower coefficient may represent the decreasing likelihood that the first user will share an interest in content objects of the user that is indirectly connected to the first user in the social graph 1100.

In some embodiments, the social networking system 1002 may calculate a coefficient based on location information. Objects that are geographically closer to each other may be considered to be more related, or of more interest, to each other than more distant objects. In some embodiments, the coefficient of a user towards a particular object may be based on the proximity of the object's location to a current location associated with the user (or the location of a client device 1006 of the user). A first user may be more interested in other users or concepts that are closer to the first user. As an example, if a user is one mile from an airport and two miles from a gas station, the social networking system 1002 may determine that the user has a higher coefficient for the airport than the gas station based on the proximity of the airport to the user.

In some embodiments, the social networking system 1002 may perform particular actions with respect to a user based on the coefficient information. The coefficients may be used to predict whether a user will perform a particular action based on the user's interest in the action. A coefficient may be used when generating or presenting any type of objects to a user. The coefficient may also be utilized to rank and order such objects, as appropriate. In this way, the social networking system 1002 may provide information that is relevant to user's interests and current circumstances, increasing the likelihood that they will find such information of interest.

In some embodiments, the social networking system 1002 may generate search results based on the coefficient information. Search results for a particular user may be scored or ranked based on the coefficient associated with the search results with respect to the querying user. As an example, search results corresponding to objects with higher coefficients may be ranked higher on a search-results page than results corresponding to objects having lower coefficients.

In connection with social-graph affinity and affinity coefficients, particular embodiments may utilize one or more systems, components, elements, functions, methods, operations, or steps disclosed in U.S. patent application Ser. No. 10/503,093, filed Aug. 10, 2006, U.S. patent application Ser. No. 11/977,027, filed Dec. 22, 2010, U.S. patent application Ser. No. 11/978,265, filed Dec. 23, 2010, and U.S. patent application Ser. No. 13/632,869, filed Oct. 1, 2012, each of which is incorporated by reference in their entirety.

In some embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. In some embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network.

In some embodiments, one or more servers may be authorization/privacy servers for enforcing privacy settings. In response to a request from a user (or other entity) for a particular object stored in a data store, the social networking system 1002 may send a request to the data store for the object. The request may identify the user associated with the request and may be sent to the user (or the client device 1006 of the user) if the authorization server determines that the user is authorized to access the object based on the privacy settings associated with the object, but not otherwise.

The preceding specification is described with reference to specific exemplary embodiments thereof. The description above and drawings are illustrative and are not to be construed as limiting. The additional or alternative embodiments may be embodied in other specific forms without departing from its spirit or essential characteristics. The scope of the invention is, therefore, indicated by the appended claims rather than by the preceding description.

All changes that come within the meaning and range of equivalency of the claims are to be embraced within their scope.

What is claimed is:

1. A method comprising:
identifying, for a user of a communication system, past live video streaming data on the communications system associated with the user;
determining, for the user and by at least one processor, one or more live video templates of a plurality of live video templates based on the past live video streaming data on the communications system associated with the user; and
providing, to a client device associated with the user, the one or more live video templates to guide the user through a live video stream broadcasted from the client device.

2. The method of claim 1, wherein the communications system facilitates live video streams within a social networking system.

3. The method of claim 1, further comprising customizing,
specific to the user, an order of the one or more live video templates based on the past live video streaming data on the communications system associated with the user, and wherein providing the one or more live video templates comprises providing the one or more live video templates in the order customized for the user.

4. The method of claim 3, wherein the past live video streaming data on the communications system associated with the user comprises data associated with previous live video streams of the user comprising a number of previous live video streams by the user, a number of viewers for the previous live video streams, and durations of the previous live video streams.

5. The method of claim 4, wherein determining the one or more live video templates of the plurality of live video templates is further based on demographic information of the user, social data of the user, interests of the user, or interests of potential viewers of a live video stream, client device data of the user, trending live video templates, or age of each live video template in the plurality of live video templates.

6. The method of claim 4, wherein determining the one or more live video templates for the user comprises:
identifying one or more user characteristics for each live video template of the one or more live video templates; and
determining the one or more live video templates for the user based on correlating the one or more identified user characteristics for each live video template with the past live video streaming data on the communications system associated with the user.

7. The method of claim 6, wherein customizing the order of the one or more live video templates comprises ordering the one or more live video templates based on a correlation score determined from the correlation between the one or more user characteristics for each live video template and the past live video streaming data on the communications system associated with the user.

8. The method of claim 1, wherein at least one live video templates of the plurality of live video templates guides the user through the live video stream using a pre-roll graphics sequence, a themed overlay, and an outro graphics sequence for the live video stream.

9. The method of claim 1, further comprising:
receiving, from the client device associated with the user, a selection of a live video template from the one or more live video templates;
receiving, from the client device associated with the user, user input associated with the selected live video template
customizing the live video stream based on the user input and the selected live video template; and
providing, via the communications system, the live video stream to one or more viewer client devices associated with one or more viewers of the communications system.

10. The method of claim 1, further comprising:
receiving, from the client device associated with the user, a live video stream that applies a live video template selected from the one or more live video templates;
providing the live video stream to one or more viewer client devices associated with one or more viewers of the communications system;
receiving, from the one or more viewer client devices, engagement signals to the live video stream; and
overlaying, in response to receiving the engagement signals, one or more digital enhancements to the live video stream.

11. The method of claim 10, wherein overlaying the one or more digital enhancements to the live video stream comprises:
identifying an image of the user within the live video stream using image recognition; and
overlaying the one or more digital enhancements over the image of the user.

12. The method of claim 11, wherein overlaying the one or more digital enhancements to the live video stream further comprises:
tracking image movements of the identified image of the user within the live video stream; and
updating positions of the one or more digital enhancements based on the tracked image movements to be over the image of the user.

13. A system comprising:
at least one processor; and
at least one non-transitory computer-readable storage medium storing instructions that, when executed by the at least one processor, cause the system to:
identify, for a user of a communication system, past live video streaming data on the communications system associated with the user;
determine, for the user, one or more live video templates of a plurality of live video templates based on the past live video streaming data on the communications system associated with the user; and
provide, to a client device associated with the user, the one or more live video templates to guide the user through a live video stream broadcasted from the client device.

14. The system of claim 13, further comprising instructions that, when executed by the at least one processor, cause the system to:
receive, from the client device associated with the user, a live video stream that applies a live video template selected from the one or more live video templates;
provide the live video stream to one or more viewer client devices associated with one or more viewers of the communications system;
receive, from the one or more viewer client devices, engagement signals to the live video stream; and overlay, in response to receiving the engagement signals, one or more digital enhancements to the live video stream.

15. The system of claim 14, wherein the instructions cause the system to overlay the one or more digital enhancements to the live video stream by:
   identifying an image of the user within the live video stream using image recognition; and
   overlaying the one or more digital enhancements over the image of the user.

16. The system of claim 15, wherein the instructions further cause the system to overlay the one or more digital enhancements to the live video stream by:
   tracking image movements of the identified image of the user within the live video stream; and
   updating positions of the one or more digital enhancements based on the tracked image movements to be over the image of the user.

17. The system of claim 13, further comprising instructions that, when executed by the at least one processor, cause the system to:
   receive, from the client device associated with the user, a selection of a live video template from the one or more live video templates;
   receive, from the client device associated with the user, user input associated with the selected live video template customize the live video stream based on the user input and the selected live video template; and
   provide, via the communications system, the live video stream to one or more viewer client devices associated with one or more viewers of the communications system.

18. The system of claim 13, wherein the past live video streaming data on the communications system associated with the user comprises data associated with previous live video streams of the user comprising a number of previous live video streams by the user, a number of viewers for the previous live video streams, and durations of the previous live video streams.

19. The system of claim 13, further comprising instructions that, when executed by the at least one processor, cause the system to:
   receive, from the client device associated with the user, a live video template selected from the one or more live video templates;
   determine that the live video template corresponds to a plurality of topics;
   identify, based on user characteristics, one or more topics from the plurality of topics; and
   overlay, within a live video stream, the one or more topics to the user as part of the selected live video template.

20. A non-transitory computer-readable medium storing instructions that, when executed by at least one processor, cause a computer system to:
   identify, for a user of a communication system, past live video streaming data on the communications system associated with the user;
   determine, for the user, one or more live video templates of a plurality of live video templates based on the past live video streaming data on the communications system associated with the user; and
   provide, to a client device associated with the user, the one or more live video templates to guide the user through a live video stream broadcasted from the client device.

\* \* \* \* \*